US012801629B2

(12) United States Patent
Restivo

(10) Patent No.: US 12,801,629 B2
(45) **Date of Patent: *Nov. 17, 2026**

(54) SYSTEMS AND METHODS FOR DATA RETENTION WHILE MIGRATING OBJECTS AND OBJECT METADATA STORED IN OBJECT STORAGE ENVIRONMENTS MIGRATED ACROSS CLOUD ECOSYSTEMS

(71) Applicant: Citibank, N.A., New York, NY (US)

(72) Inventor: Justin Restivo, Dallas, TX (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/322,551

(22) Filed: Sep. 8, 2025

(65) Prior Publication Data

US 2026/0003890 A1 Jan. 1, 2026

Related U.S. Application Data

(63) Continuation of application No. 19/088,947, filed on Mar. 24, 2025, now Pat. No. 12,411,868, which is a continuation-in-part of application No. 18/904,046, filed on Oct. 1, 2024, now Pat. No. 12,536,193, which is a continuation of application No. 18/478,454, filed on Sep. 29, 2023, now Pat. No. 12,130,836.

(51) Int. Cl.
*G06F 16/27* (2019.01)
*G06F 16/2457* (2019.01)

(52) U.S. Cl.
CPC ........ *G06F 16/27* (2019.01); *G06F 16/24573* (2019.01)

(58) Field of Classification Search
CPC .. G06F 16/27; G06F 16/24573; G06F 16/116; G06F 16/214; G06F 16/254; G06F 16/258; G06F 16/84
USPC ......................... 707/756, 602, 809, 810, 975
See application file for complete search history.

(56) References Cited

FOREIGN PATENT DOCUMENTS

EP 4535183 A1 * 4/2025 ........... G06F 16/185

* cited by examiner

*Primary Examiner* — William P Bartlett
(74) *Attorney, Agent, or Firm* — Foley & Lardner LLP

(57) ABSTRACT

Systems and methods for novel uses and/or improvements to data migration. In particular, systems and methods for data migration of metadata stored in object storage from one container to another, especially in instances when the metadata is destined for ingestion by an artificial intelligence application. The systems and methods ensure that all metadata (e.g., metadata stored in object storage) is preserved during data migration, including metadata such as content type, object lock mode, object lock retain until date, and/or custom metadata.

20 Claims, 10 Drawing Sheets

212

Target Bucket

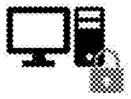

```
{
   "key": "600-600_hq.gif",
   "headers": {
     "AcceptRanges": "bytes",
     "LastModified": "2023-07-03T20:07:59+00:00",
     "ContentLength": 6284720,
     "ETag": "\"7b89ce26fa1fd9f617531766c2e2565a\"",
     "VersionId": "IT.pRyAAGwoChkX3StqXfCQxDr1irO1J",
     "ContentType": "image/gif",
     "ServerSideEncryption": "AES256",
     "Metadata": {
       "old-sha256":
"5c90010edb021f47a6f1655ebf1c674cc15e085ec320a22faa76012165a0df35",
       "Custom_Metadata": "Value_1",
       "old-objectlockmode": "GOVERNANCE",
       "old-objectlockretainuntildate": "2023-07-03T19:55:05+00:00",
       "old-content-length": "6284720",
       "old-etag": "\"7b89ce26fa1fd9f617531766c2e2565a\"",
       "old-content-type": "image/gif",
       "old-key": "600-600_hq.gif",
       "old-lastmodified": "2023-07-03T17:26:01+00:00"
       "old-serversideencryption": "AES256",
     },
     "ObjectLockMode": "GOVERNANCE",
     "ObjectLockRetainUntilDate": "2023-07-04T20:07:58.228000+00:00"
Or
     "ObjectLockRetainUntilDate": "DEFAULT"
   }
 }
```

Preserved Source Data

Consistent Retention Data

Supplemental Staging Data

FIG. 2C

220

```
# Function to extract metadata from a file
extract_metadata() {
  local file_path="$1"

  # Extract metadata block from file
  metadata=$(tail -c 5000 "$file_path" | strings | sed -n '/S3_START{/,/}S3_END/p' | sed
'1d;$d')
# Function to upload file with metadata
upload_file() {
  local file_path="$1"
  local key="${file_path#$UPLOAD_DIR/}" # Remove upload directory prefix
  local attempt=0
  # Extract metadata
  metadata_json=$(extract_metadata "$file_path")
  # Remove metadata before upload (recreate without metadata)
  temp_file=$(mktemp)
  head -c -5000 "$file_path" > "$temp_file" || cp "$file_path" "$temp_file"
  while (( attempt < MAX_RETRIES )); do
    echo "Uploading $key (attempt $((attempt+1)))..."
    if aws s3 cp "$temp_file" "s3://$BUCKET_NAME/$key" >> "$ERROR_LOG" 2>&1; then
      echo "Uploaded $key"
# Function to process all files in the upload directory
process_local_files() {
  echo "Starting upload process..."
  find "$UPLOAD_DIR" -type f | while read -r file_path; do
    upload_file "$file_path" || continue
    echo "Processed $file_path"
  done
}
# Run the process
process_local_files
```

FIG. 2D

SYSTEMS AND METHODS FOR DATA RETENTION WHILE MIGRATING OBJECTS AND OBJECT METADATA STORED IN OBJECT STORAGE ENVIRONMENTS MIGRATED ACROSS CLOUD ECOSYSTEMS

CROSS-REFERENCE TO RELATED APPLICATIONS

This application is a continuation of U.S. patent application Ser. No. 19/088,947, filed Mar. 24, 2025, which is a continuation-in-part of U.S. patent application Ser. No. 18/904,046, filed Oct. 1, 2024, which is a continuation of U.S. patent application Ser. No. 18/478,454, filed Sep. 29, 2023. The content of the foregoing applications is incorporated herein in its entirety by reference.

BACKGROUND

Cloud computing is a technology and service model that involves the delivery of computing resources and services over the internet. Instead of owning and maintaining physical servers and data centers, organizations and individuals can access and use computing resources, including servers, storage, databases, networking, software, and more, on a pay-as-you-go or subscription basis from cloud service providers. These resources are hosted and managed in remote data centers operated by cloud providers. Cloud storage is a cloud computing service that provides a way to store and manage data in remote data centers over the internet. Instead of storing data on local or on-premises hardware, users and organizations can leverage cloud storage services provided by cloud service providers. Cloud storage offers several key advantages, including scalability, accessibility, redundancy, and cost-effectiveness. Typically, cloud storage is provided through the use of a container (e.g., an S3 bucket), which refers to a storage address location and space within a cloud storage service that utilizes the S3 protocol. When staying in the same cloud provider or ecosystem, migrating data from one container to another is generally straightforward and commonly performed for various reasons.

Data migration does, however, present challenges with migrating objects utilizing object storage. For example, in contrast to a file storage system (e.g., NFS), where files are stored in directories and subdirectories (e.g., folders), in object storage, files are stored as "objects" in a "flat" address space, almost as if the objects are in a single folder. In object storage, each object has a unique identifier and associated metadata, which enables object storage platforms to find the associated data quickly and easily. This metadata is critical to reference where these objects exist in the object storage platform. Moreover, maintaining the integrity of the metadata (e.g., during and after migration) is important as this metadata may be searched natively, is editable in-place, and may be easily ingested for artificial intelligence models, including, but not limited to, machine learning, deep learning, etc. (referred to collectively herein as artificial intelligence models, machine learning models, or simply models).

Despite this importance, metadata stored in object storage is susceptible to deletion and/or modification when attempting to migrate this data from one container to another. Furthermore, as container to container migration typically arises when migrating data from one cloud provider to another, cloud providers have an incentive to "lock-in" current users and leave this issue unaddressed. As such, the conventional standard for handling data migration is to "move and rebuild" this metadata. That is, data is migrated from one container to another despite the lost and/or modification of the metadata with the understanding that the data must be repaired after transfer.

SUMMARY

Systems and methods are described herein for novel uses and/or improvements to data migration. In particular, systems and methods are described herein for data migration of metadata stored in object storage from one container to another, especially in instances when the metadata is destined for ingestion by an artificial intelligence application. More specifically, the systems and methods ensure that all metadata (e.g., metadata stored in object storage) is preserved during data migration, including metadata such as content type, last modified date, creation date, object lock mode, object lock retain until date, and/or other custom metadata from one cloud-based container environment to another.

Notably, the systems and methods preserve this metadata even in instances of migrating from object storage to file storage, which is technically challenging because of fundamental differences in how metadata is stored and managed in these two storage systems. In object storage, metadata is stored separately from the object itself as key-value pairs in a metadata database, allowing for extensive customization, easy retrieval via API ("application programming interface") calls, and independent updates without modifying the object. In contrast, file storage (e.g., traditional file systems like NTFS, ext4, or HFS+) associates metadata directly with files but typically has limited predefined metadata attributes, such as creation date, last modified date, file size, and permissions. It does not inherently support the flexible key-value metadata model of object storage. As a result, when migrating data from object storage to file storage, many metadata attributes may not have a direct equivalent in the file system, leading to data loss or metadata restructuring issues even if steps are taken to preserve the integrity of the metadata.

To overcome these technical deficiencies in preserving metadata integrity when migrating metadata from object storage to file storage, the systems and methods use a novel data migration strategy that involves directly injecting object storage metadata into the file storage properties. By doing so, the integrity of the metadata is maintained, and no data is lost when moving from an object storage platform to a file storage platform. These systems and methods introduce numerous technical benefits both to the storage and use of metadata. First, the systems and methods allow for data to seamlessly migrate from object storage to file storage with no data loss or any negative effect on data integrity. As such, data holders do not need to fear "lock-in" by cloud providers as discussed above.

Second, the systems and methods allow for this migration to occur in a system-wide batch or ad-hoc approach targeting specific metadata. While a system-wide batch approach may be beneficial for a permanent (or semi-permanent) migration, the ability of the systems and methods to target specific metadata opens new opportunities for on-demand use of the metadata. For example, the systems and methods allow for metadata to be targeted for migration without accessing or downloading the corresponding objects. Not only does this reduce the amount of computing resources required to process and store data during the migration, but this also increases the speed at which the migration may occur. Because of this increase in speed, the data migration may be used to serve real-time (or near-real-time) data needs such as in serving on-demand applications and/or artificial intelligence models.

To achieve these technical benefits, the system accesses object storage and determines an object key for metadata to be migrated. The system may then retrieve a local file path to a file in file storage. The system may then directly inject the metadata located based on the object key into the file via the local file path. Through this direct injection, which is not a native data migration route, the integrity of the object-stored metadata is preserved (e.g., a "last modified date" remains in its native form reflecting the date that the object-stored metadata was last modified at the object storage and not the date of the ingestion to the file storage). As a further technical benefit, no data is lost during the ingestion. Moreover, in addition to the injection procedure being able to target object-stored metadata without accessing the underlying object data (and thus creating security or privacy concerns), the system can target specific portions of the object-stored metadata. For example, the system can search, locate, and migrate specific portions of object-stored metadata. As yet a further technical benefit, the system may not only target specific portions of the object-stored metadata, but the system may also inject the object-stored metadata into specific locations and/or within predetermined boundaries as well as within predetermined constraints or rules. For example, the object-stored metadata may be place into the beginning or end of a file (e.g., to case parsing and/or later extraction) and may be subject to content restrictions (e.g., to cleanse data of personally identifiable information and/or other objected to content).

In some aspects, systems and methods for data retention while migrating metadata stored in object storage of objects being migrated across container ecosystems are described. For example, the system may retain data while migrating object-stored metadata from an object storage platform to a file storage platform. For example, the system may receive a first request to migrate first object-stored metadata for a first object from a first location to a second location, wherein the first location comprises object storage, and wherein the second location comprises file storage. The system may, in response to the first request, initialize a configuration for migrating the first object-stored metadata from the first location to the second location by determining a first object key for the first object-stored metadata at the first location and determining a first file path to a first file at the second location. The system may execute, based on the first object key and the first file path, a first function to migrate the first object-stored metadata from the first location to the second location. The system may, based on the first function, generate first file-stored metadata corresponding to the first object-stored metadata in the first file. The system may store the first file with the first file-stored metadata at the second location.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 2A-2D show illustrative diagrams of metadata and/or pseudocode for data migration, in accordance with one or more embodiments.

DETAILED DESCRIPTION OF THE DRAWINGS

Figure 1A:
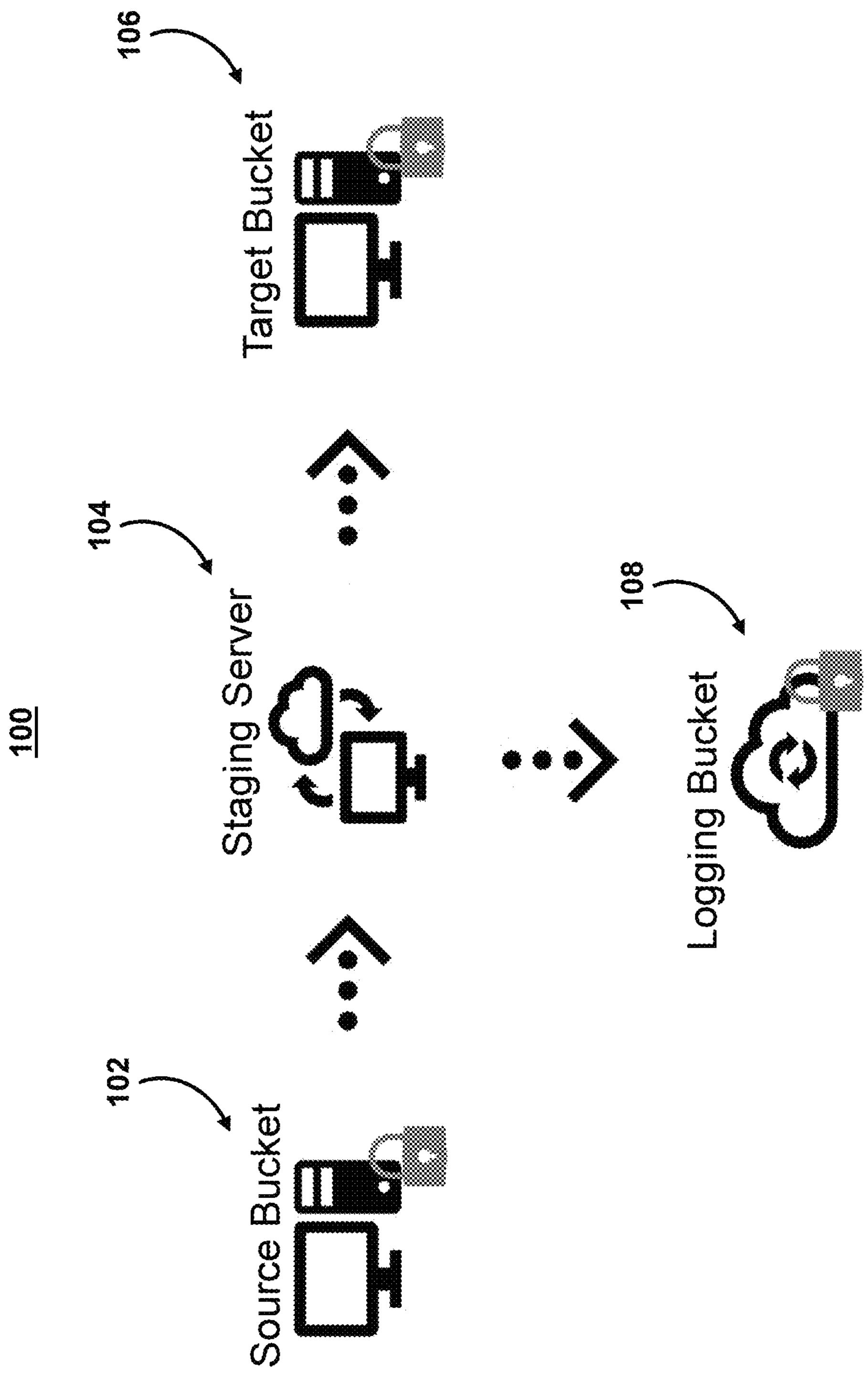
FIGS. 1A-1B show illustrative diagrams of data migration systems, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Systems and methods are described herein for novel uses and/or improvements to data migration. In particular, systems and methods are described herein for data migration of metadata stored in object storage from one container to another, especially in instances when the metadata is destined for ingestion by an artificial intelligence application. More specifically, the systems and methods ensure that all metadata (e.g., metadata stored in object storage) is preserved during data migration, including metadata such as content type, last modified date, creation date, object lock mode, object lock retain until date, and/or other custom metadata from one cloud-based container environment to another.

To overcome these technical deficiencies in conventional data migration systems, the systems and methods use a novel object migration strategy that involves generating a supplemental data structure that is migrated with the object from a source location (e.g., a source bucket) to a target location (e.g., a target bucket). For example, in existing systems, metadata stored in object storage does not transfer. As such, this object-stored metadata for the object is lost. The systems and methods overcome this issue by generating supplemental data structure (e.g., an array representing the object-stored metadata). The supplemental data structure is then stored in a staging platform for the data migration and linked to the source location using an object identifier that is linked to an object header in the source location. The system then performs the data migration and changes the link in the object identifier from a first object header at the source location to a second object header at the target location as part of the same function as the data migration of the object. Through the use of the supplemental data structure and its transfer via the changing identifier, the object-stored metadata that was stored at the source location is now stored with the object at the target location. Furthermore, the data included in the supplemental data structure is not subject to data migration ingestion procedures at the target location and thus is preserved in its native form. Accordingly, object-stored metadata (e.g., last modified date) remains in its native form (e.g., reflecting the date the data was last modified at the source location) and is not changed based on the ingestion procedure at the target location (e.g., to reflect the date of the data migration).

Despite the use of the supplemental data structure and source identifier change, there is nonetheless a risk that some metadata may be modified. Moreover, even if the metadata is not modified, there is a need to validate that there was no modification. While a manual review could accomplish this, such a procedure is not practical. As such, the supplemental data structure further comprises a hash value of the array of data in the supplemental data structure. As the hash value is stored in the supplemental data structure, the has value is also linked to the object in the target location upon the source identifier change. As such, the system may validate the hash value to confirm that the metadata is not modified upon upload at the target source.

As a further benefit of the supplemental data structure, the system and methods may provide benefits beyond ensuring proper data retention during data migration. For example, the system may also add additional object-stored metadata that was not present at the source location. Such additional object-stored metadata may include additional retention rules for the data post-data migration.

For example, the systems and methods provide resiliency for migrated infrastructure and allow for metadata from one container to be migrated away from conventional containers despite that metadata comprising highly complex workflows (e.g., such as retention buckets) as well as the dependencies thereto. These buckets can exist for internal regulatory purposes, or federally regulated purposes, or compliance purposes. In conventional systems, there is no mechanism to move any objects under retention, let alone while preserving metadata.

As described herein, "metadata" may refer to additional information or attributes associated with classes, objects, methods, properties, and other elements of a program. Metadata provides valuable information about the structure and behavior of program components, and it can be used for documentation, code analysis, reflection, and various other purposes. In some embodiments, metadata may comprise any content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user. For example, the system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user. User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

Metadata may include name metadata (e.g., a name or unique identifier for the object, which is often used to reference and access it), class metadata (e.g., information about class-level attributes, such as class variables or static fields), method metadata (e.g., information about the method's parameters, including names, types, and default values), field metadata (e.g., information about the field, such as validation rules or serialization hints), object metadata (e.g., information about the unique identity of an object, often provided by a unique identifier or hash code), method parameters metadata (e.g., information about the parameters of a method, including parameter names, data types, and any associated annotations or attributes), annotations and attributes (e.g., annotations and attributes are a powerful way to attach metadata to various program elements, including classes, methods, fields, and parameters), reflection metadata (e.g., information that allows for runtime inspection and manipulation of metadata associated with program elements, documentation comments (e.g., well-structured comments, such as JavaDoc or XML comment), annotations processors (e.g., information that can generate additional code or perform actions based on annotations to drive code generation or behavior), and/or serialization metadata (e.g., information related to object serialization, such as field names, types, or versioning information, which is used during serialization and deserialization processes).

As described herein, metadata may be categorized into a plurality of metadata types, including descriptive metadata, structural metadata, administrative metadata, technical metadata, rights metadata, and preservation metadata. Descriptive metadata is used to provide information about the content, context, and characteristics of data or resources. It helps users discover, identify, and understand the data. Examples may include title (e.g., the title or name of the data or resource), description (e.g., a textual description or summary of the data's content), author (e.g., the creator or author of the data), date created (e.g., the date when the data was created or last modified), object size (e.g., often measured in bytes or another appropriate unit), and keywords (e.g., keywords or tags that describe the data's subject or content).

Structural metadata defines the structure or organization of data, especially in the context of complex data formats or hierarchical structures. It helps in navigating and interpreting data. Examples include file format (e.g., the format of the data file (e.g., JPEG, MP3, PDF)), data schema (e.g., the structure or schema of a database or XML document), and table of contents (e.g., structural information about chapters or sections).

Administrative metadata is used for managing and maintaining data throughout its lifecycle. It includes information about data ownership, access rights, and preservation. Examples include access control (e.g., information about who can access and modify the data), data ownership (e.g., details about the entity or person responsible for the data), version history (e.g., a record of changes and versions of the data), and retention policies (e.g., rules and policies regarding data retention and disposal).

Technical metadata describes the technical aspects of data, including its format, encoding, and technical requirements for processing or displaying the data. Examples include file size (e.g., the size of the data file in bytes), resolution (e.g., pixels per inch), encoding (e.g., the character encoding used for text data (e.g., UTF-8, ASCII)), and data type (e.g., the data type or format (e.g., integer, float) of numerical data).

Rights metadata provides information about intellectual property rights, copyright, licensing, and usage restrictions associated with data. Examples include copyright information (e.g., details about copyright holders and licensing terms), usage permissions (e.g., information about how the data can be used, shared, or redistributed), and rights holder (e.g., the entity or individual who holds rights to the data).

Preservation metadata is used to ensure the long-term preservation and accessibility of digital resources. It includes information necessary for data archiving and migration. Examples include checksums (e.g., hash values or checksums to verify data integrity), format migration information (e.g., details on how data formats will be migrated over time), and provenance (e.g., information about the history and origins of data).

Metadata, and types of metadata, may be stored in various manners. For example, object storage, file storage, and block storage are three distinct types of storage technologies used in computing and data storage. They differ in terms of their architecture, use cases, and how they store and manage data.

Block storage divides data into fixed-sized blocks and stores each block as an individual unit with a unique address. These blocks are managed by a storage controller or storage area network (SAN). Block storage is commonly used for critical applications where performance, reliability, and consistency are essential, such as databases and virtual machines (VMs). It is often used in enterprise environments where high I/O operations are required. Characteristics of block storage include low-level storage (e.g., applications and file systems manage the data structure, making it flexible for customizations), high performance and low latency, lacking file structure or metadata awareness (e.g., no awareness of the data's content or file hierarchy), and data access is at the block level (e.g., each block treated as a separate entity).

File storage organizes data into files and directories. It uses a file system to manage metadata and hierarchical structures. File storage is suitable for shared data and file sharing scenarios. It is commonly used in network-attached storage (NAS) systems for home and office file sharing, as it is appropriate for applications that require easy access to files and directories. Characteristics of file storage include organization of data into a hierarchical structure with directories and files, support for file-level access permissions and access control lists (ACLs), and automatic provision of metadata about files, such as file names, sizes, and timestamps.

Object storage stores data as objects, each of which contains the data, metadata, and a unique identifier. Objects are organized in a flat namespace and can be stored across multiple servers or storage nodes. Object storage is designed for storing vast amounts of unstructured data, such as backups, archives, media files, and cloud-based data storage. A characteristic of object storage is that it stores data as objects, each with a unique identifier (e.g., a URL). Object storage is very scalable and useful for distributed architectures, making it suitable for large-scale data storage. It is ideal for scenarios where metadata is crucial, as each object contains metadata. Object storage systems are highly durable and resilient to hardware failures. Additionally, object storage is compatible with RESTful APIs for data access.

Object storage, file storage, and block storage have some key differences as it relates to data structure, use cases, metadata, scalability and redundancy, and access methods. With respect to data structure, block storage deals with raw blocks of data, often at the lowest level, without knowledge of the file structure. File storage organizes data into a hierarchical file and directory structure. Object storage stores data as objects, each with associated metadata. With respect to use cases, block storage is suitable for performance-critical applications and virtualization. File storage is ideal for shared file systems and environments where data is organized in directories and files. Object storage is designed for scalable, unstructured data storage and retrieval, especially in cloud and archive scenarios. With respect to metadata, block storage typically lacks metadata about data content. File storage includes file metadata (e.g., file names, permissions). Object storage embeds metadata with each object, making it suitable for content-rich data. With respect to scalability and redundancy, block storage and file storage may rely on complex redundancy configurations. Object storage systems are designed for easy scalability and built-in redundancy. With respect to access methods, block storage and file storage use block-level and file-level access, respectively. Object storage provides object-level access via HTTP-based APIs.

FIG. 1A shows an illustrative diagram of a data migration system, in accordance with one or more embodiments. For example, system 100 may be used for data retention while migrating metadata stored in object storage of objects being migrated across container ecosystems.

System 100 includes source location 102. Source location 102 may comprise a data source or repository within a cloud computing environment where data is stored. Source location 102 may comprise any computing device that provides data for migration. System 100 also includes target location 106, which may also comprise a data source for receiving data in a migration.

System 100 includes staging server 104. As described herein, a staging server, in the context of cloud data migration, may refer to an intermediary environment or platform that serves as a transitional step in the data migration process. It acts as a temporary storage and processing area for data that is being moved from a source location (e.g., source location 102) to a target location (e.g., target location 106) within the cloud. A staging server may comprise any computing component used to facilitate the efficient, organized, and/or controlled transfer of data during a migration project. For example, in some embodiments, system 100 may generate a first supplemental data structure comprising on an array and a first source identifier. The system may then store the first supplemental data structure at a staging location.

During data migration, data may be initially extracted from the source location 102 or systems and collected in staging server 104. This step may involve exporting data from databases, files, or other data sources (e.g., source location 102). At staging server 104, the system may perform one or more data transformation. For example, data often needs to be transformed or converted to match the format, structure, or schema required by the target system in the cloud. Staging server 104 may be used for this purpose, allowing data transformation scripts or tools to process the data before it's moved to target location 106. Staging server 104 may also be used for data validation, which involves checking for errors, inconsistencies, or missing information in the data. Staging server 104 may also be used for data cleansing, and enrichment tasks can also take place within the staging server.

Staging server 104 may also perform migration testing, which involves verifying that the migration process works as expected, and the data will be accurately transferred to the target environment. Staging server 104 may also be used to optimize the performance of data migration. For example, data can be preloaded into the staging server to reduce downtime during the final migration step.

Additionally or alternatively, staging server 104 may have security measures in place to protect sensitive data during the migration process. Access controls, encryption, and audit trails can be implemented to ensure data security. In case of unexpected issues during migration, staging server 104 can act as a safeguard. If data migration to the target fails or results in undesirable outcomes, the process can be rolled back to a previous state in the staging environment without affecting the production environment. Once data has been validated, transformed, and tested in staging server 104, the system may migrate the data to target location 106, which may be a cloud-based storage, database, or application in the target environment.

System 100 includes logging location 108. For example, logging location 108 may comprise a server that is used to centralize and store log data generated during the migration process. The primary purpose of a logging server is to capture and record various events, activities, and errors that occur throughout the data migration, providing a centralized repository for monitoring, troubleshooting, and auditing purposes. For example, logging location 108 may comprise a log collection. During the data migration process, numerous events and activities are logged by various components involved in the migration. These logs can include information about data transfers, transformations, validation checks, errors, and other relevant details. Logging location 108 collect and store these logs in a structured and organized manner.

Logging location 108 may also provide a centralized location for storing logs, ensuring that all relevant data is easily accessible in one place. This centralization simplifies the process of monitoring and managing logs compared to scattered logs across different systems or resources. For example, data migration logs are valuable for monitoring the progress of the migration in real-time. Monitoring tools and dashboards can be set up to analyze log data, providing insights into the performance, status, and health of the migration. Operators can quickly identify issues and take corrective actions as needed. When errors or issues arise during the migration, logs stored on logging location 108 are a valuable resource for troubleshooting. IT and operations teams can review log entries to pinpoint the root causes of problems and determine the necessary actions for resolution.

Many organizations have regulatory and compliance requirements that mandate the retention of detailed logs for data migration activities. Logging location 108 may help meet these requirements by securely storing comprehensive records of data migration events. These logs can be used for auditing and compliance reporting. Log data can also be used for performance optimization and tuning. By analyzing logs, organizations can identify bottlenecks, optimize data transfer processes, and fine-tune the migration workflow for better efficiency. Furthermore, these logs may be used as training data for artificial intelligence applications.

Logging servers often have security features to protect log data from tampering or unauthorized access. Access controls and encryption may be implemented to ensure the integrity and confidentiality of log records. For example, even after the migration is complete, logs stored on logging location 108 serve as historical records of the migration process. These records can be valuable for post-migration analysis, reporting, and documentation. For example, when generating the array of the first object-stored metadata, the system may input the first object-stored metadata into an artificial intelligence model, wherein the artificial intelligence model is trained on object-stored metadata samples to generate arrays of data. The system may receive an output from the artificial intelligence model, wherein the array is based on the output. The object-stored metadata sample comprises data comprising historical records of the migration process and/or post-migration analysis, reporting, and documentation.

In some embodiments, the system may generate a first entry in a retention log of the staging location, wherein the first entry corresponds to the first object. The system may generate a second entry in the retention log of the staging location, wherein the second entry corresponds to the first supplemental data structure. For example, the system may log supplemental data structures and objects separately in order to facilitate the supplemental data structures being migrated separately (albeit simultaneously) from the objects. By doing so, the system may avoid the data ingestion procedures of the target source that may modify and/or delete the metadata.

Figure 1B:
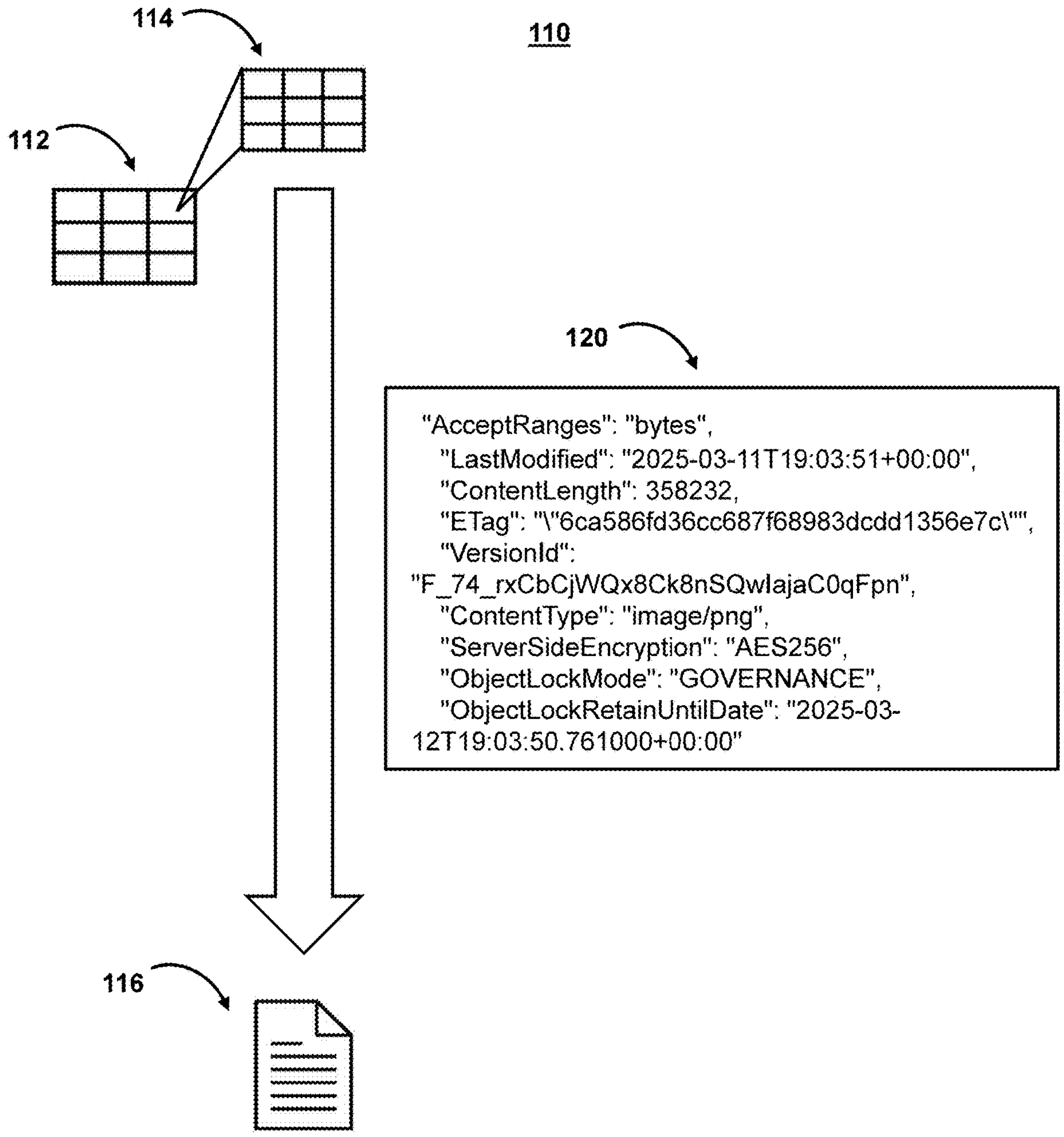

FIG. 1B shows an illustrative diagram of a data migration system, in accordance with one or more embodiments. For example, FIG. 1B shows diagram 110. As shown in diagram 110, first object-stored metadata (e.g., object-stored metadata 114) for a first object (e.g., object 112) from a first location to a second location. For example, the first location may comprise object storage, wherein the first object-stored metadata is stored outside the first object.

As described herein, object-stored metadata for a first object may refer to metadata attributes that describe and provide additional information about the object but are stored separately from the object's actual data within an object storage system. In this context, the first location is object storage, which may be a highly scalable and distributed storage architecture where objects are stored with associated metadata rather than within a traditional file hierarchy. The first object-stored metadata is maintained externally from the object itself, meaning that it is not embedded within the file but instead managed in a metadata database or key-value store associated with the object storage platform.

This externally stored metadata can be divided into system metadata and user-defined metadata. System metadata includes attributes automatically generated and maintained by the storage system, such as object size, creation timestamp, last modified timestamp, content type, storage class, and encryption status. These attributes help manage and optimize storage operations while ensuring data integrity and accessibility. In contrast, user-defined metadata consists of custom key-value pairs that users can assign to objects, such as document categories, owner information, processing status, or application-specific tags. This metadata enhances searchability, automation, and management within the storage system.

Because object-stored metadata is stored separately from the object's binary data, it can be retrieved without downloading the object itself, using metadata-specific API calls such as HEAD requests in AWS S3 (aws s3api head-object) or equivalent queries in other object storage platforms. This separation provides several advantages, including faster metadata retrieval, efficient storage management, and seamless scalability, as metadata operations do not require accessing or modifying the stored object's actual content. By maintaining metadata externally, object storage systems enable powerful data organization, indexing, lifecycle policies, and access control while keeping objects immutable and efficiently managed within distributed environments.

For example, the relationship between a first object and its first object-stored metadata is defined using a key-value pair system, where the key represents the metadata attribute name, and the value contains the corresponding metadata information. In an object storage system, metadata is stored separately from the actual object data but remains directly associated with the object through these key-value pairs. This approach enables efficient retrieval, organization, and management of metadata without modifying or accessing the object's binary data.

Each object in storage is uniquely identified by an object key, which serves as its reference within the storage system. The object-stored metadata is linked to the object using this key and is structured in a key-value format, allowing both system-defined and user-defined metadata to be stored. System-defined metadata includes attributes such as "Last-Modified": "2024-03-21T10:15:30Z" (indicating the last update time) or "Content-Type": "image/png" (defining the object's format). User-defined metadata is custom information that can be assigned to an object, such as "Project": "AI_Model" or "Retention-Policy": "7_years", enabling flexible categorization and retrieval.

Because metadata is maintained as a structured key-value store, the system can quickly query or update metadata without requiring access to the object's actual data. Storage platforms such as AWS S3, Google Cloud Storage, and Azure Blob Storage allow users to retrieve metadata using API calls like HEAD requests, which return metadata key-value pairs without downloading the object. This structure ensures that metadata can be indexed, searched, modified, and applied for access control, lifecycle policies, and automation while maintaining a scalable, efficient storage architecture.

As described herein, file-stored metadata may refer to metadata that is physically stored within the file itself, rather than externally managed by a separate system or storage platform. This type of metadata is typically embedded in a structured format—such as JavaScript Object Notation (JSON)—either at the beginning or end of the file, or within designated sections of the file's content. For example, first file-stored metadata may consist of a block of JSON-formatted text that includes descriptive information such as the file's origin, processing status, related tags, version history, or user-defined attributes.

Unlike file system metadata (such as creation date or permissions), which is maintained by the operating system, file-stored metadata travels with the file regardless of where it is moved or copied. This makes it particularly useful in scenarios where metadata must remain intact across environments or storage types—such as when migrating data from object storage to file storage. In such cases, the system may extract object-stored metadata and embed it into the file using a standardized format like JSON, surrounded by clear delimiters (e.g., "S3_START{" and "}S3_END"), so it can later be identified, parsed, and used to reconstruct or rehydrate metadata when transitioning back to object storage or another metadata-aware system. Storing metadata in this manner enables metadata-driven workflows, search, and processing even in environments that do not natively support metadata management, ensuring consistency and traceability throughout the file's lifecycle.

Diagram 110 shows a migration of first object-stored metadata (e.g., object-stored metadata 114) to a first file (e.g., file 116) at a second location, wherein the second location comprises file storage. As further shown by diagram 110, a portion (e.g., portion 120) of first object-stored metadata is preserved during the data migration. The system accesses object storage and determines an object key for metadata to be migrated. The system may then retrieve a local file path to a file in file storage. The system may then directly inject the metadata located based on the object key into the file via the local file path. Through this direct injection, which in not a native data migration route, the integrity of the object-stored metadata is preserved (e.g., a "last modified date" remains in its native form reflecting the date that the object-stored metadata was last modified at the object storage and not the date of the ingestion to the file storage. As a further technical benefit, no data is lost during the ingestion. Moreover, in addition to the injection procedure being able to target object-stored metadata without accessing the underlying object data (and thus creating security or privacy concerns), the system can target specific portions of the object-stored metadata. For example, the system can search, locate, and migrate specific portions of object-stored metadata. As yet a further technical benefit, the system may not only target specific portions of the object-stored metadata, but the system may also inject the object-stored metadata into specific locations and/or within predetermined boundaries as well as within predetermined constraints or rules. For example, the object-stored metadata may be placed at the beginning or end of a file (e.g., to case parsing and/or later extraction) and may be subject to content restrictions (e.g., to cleanse data of personally identifiable information and/or other objected to content).

Diagram 110 may illustrate a system that ensures data integrity and metadata preservation while migrating object-stored metadata from an object storage platform (such as AWS S3) to a file storage platform by following a structured, fault-tolerant approach. The process begins with initializing the configuration, where AWS credentials, the S3 bucket name, region, local download directory, error log, and retry limits are defined. This establishes secure access to the object store and proper local file management. Before proceeding, the system checks for required tools, ensuring that the AWS CLI (for object store interactions) and jq (for JSON parsing) are installed. If any tools are missing, the process exits with an error to prevent execution failures.

For example, once the necessary tools are confirmed, the system prepares directories and cleans up logs, creating a dedicated directory for downloads if it does not already exist. The system may also remove outdated logs to maintain a clean metadata tracking environment. The file download function may then be executed for each object stored in S3. The system may determine the S3 object key, create the required local directory structure, and attempt to download the file using AWS CLI commands. If the download fails, the system logs the error and moves on to the next file, ensuring uninterrupted processing.

To verify data consistency, the system may perform a hash comparison after downloading each file, ensuring that the local copy is identical to the original object in S3. Once verified, the system fetches metadata for the downloaded object using the aws s3api head-object command. If successful, the metadata is extracted and stored in JSON format for further processing. Next, the system embeds metadata into the file itself, appending it at the end of the file (EOF) in a structured format.

This format ensures that metadata remains retrievable and distinguishable from file content while being preserved within the file system. After embedding the metadata, the system processes all S3 files by iterating through the list of objects in the bucket. For each file, the system attempts to download the object, fetches metadata, embeds it into the file, and marks the file as processed to prevent duplication.

To ensure final data integrity, the system may conduct another hash comparison after metadata embedding. This verifies that only metadata was added without modifying the original file content, ensuring that the file remains an exact copy of its original version. By embedding metadata directly into files while maintaining hash consistency, this process allows for future rehydration into an object store without losing metadata attributes. The combination of error handling, retry mechanisms, and data verification ensures a fault-tolerant, efficient, and reliable migration from object storage to file storage.

FIGS. 2A-2D show illustrative diagrams of metadata and/or pseudocode for data migration, in accordance with one or more embodiments. For example, the system may receive, at a user interface, a first user input requesting that a first object, at a source location, be migrated to a target location. As referred to herein, a "user interface" may comprise a human-computer interaction and communication component for a device, and may include display screens, keyboards, a mouse, and the appearance of a desktop. For example, a user interface may comprise a way a user interacts with an application or a website. For example, the system may receive, at a user interface, a first user input requesting that the first object be migrated. The system may receive, at the user interface, a second user input identifying the source location. The system may receive, at the user interface, a third user input identifying the target location.

Figure 2A:
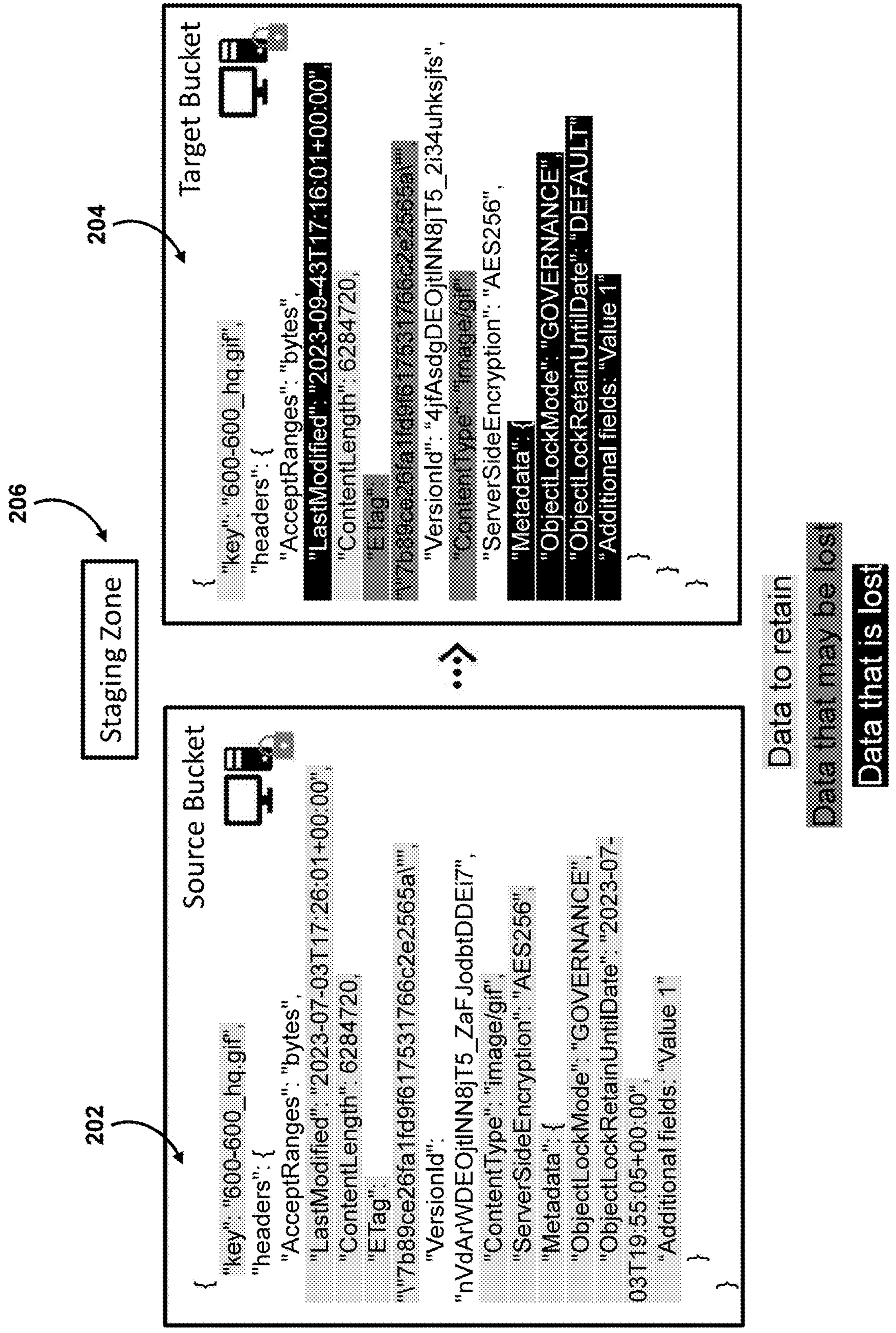
Figure 2B:
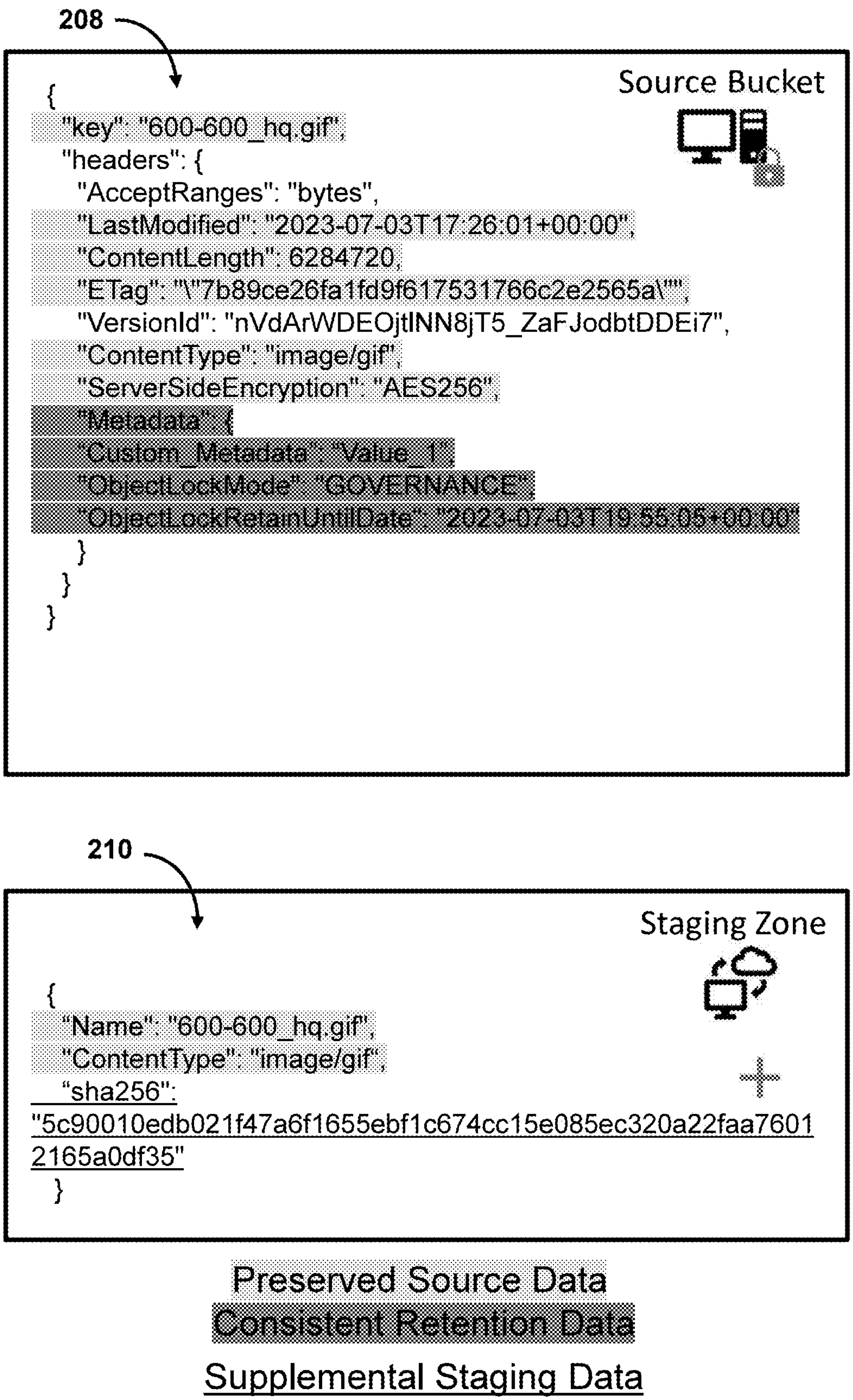

As shown in FIG. 2A, the first object may comprise metadata 202 and metadata 204. Metadata 202 may comprise metadata that is retained (e.g., file property metadata), metadata that may be lost, and metadata that is lost (e.g., object-stored metadata) in a conventional system as shown by metadata 204. For example, as the first object is transitioned from a source location to a target location via staging location 206, object-stored metadata present in metadata 202 is lost in metadata 204 (as indicated in FIG. 2A). In order to ensure that the data marked in FIG. 2A, as metadata that may be lost or data that is lost, the system may generate supplemental data structure 210 as shown in FIG. 2B.

As described herein, the "supplemental data structure" may refer to an additional data structure or set of information that complements the primary metadata associated with the object. This supplemental data structure may be used to provide additional context, details, and/or annotations about the object and/or object-stored metadata for the object, enhancing its usability and understanding. The purpose of supplemental data structures is to enrich the metadata and provide a more comprehensive description of the object-stored metadata for the object.

The supplemental data structures may include tagging or categorization systems. Tags or labels can be applied to assets to indicate their content, topic, or relevance. Taxonomies, which are hierarchical structures of categories or terms, provide a structured way to organize and navigate metadata. Additionally or alternatively, the supplemental data structure may comprise user comments and/or annotations. For example, users may add comments, notes, or annotations to an asset to provide context, explanations, or feedback. These comments can be part of the supplemental data associated with the object.

Additionally or alternatively, the supplemental data structure may comprise a version history for the object. For objects that undergo revisions, a version history is a supplemental data structure that tracks changes over time. It includes information about who made the changes, when they were made, and the nature of the changes. Additionally or alternatively, the supplemental data structure may comprise usage statistics. For example, supplemental data can include statistics related to the object's usage, such as the number of views, downloads, or interactions. These statistics help gauge the object's popularity and usefulness (and/or need for retention).

Additionally or alternatively, the supplemental data structure may comprise access control and permissions. For example, information about who has access to the object and what permissions they have (e.g., read-only, edit). Supplemental data structures may also include links to related objects or resources. For geospatial objects, such as maps or location-based data, supplemental data structures can include coordinates, geographic boundaries, and spatial reference information. Many systems allow for custom fields or attributes to capture specific information that is not covered by the standard metadata schema. These custom fields become part of the supplemental data.

Additionally or alternatively, the supplemental data structure may comprise information about how objects are related to each other, such as parent-child relationships, dependencies, or references. Information about the source of the object, its creators, contributors, and licensing details may be included in supplemental data structures.

Additionally or alternatively, the supplemental data structure may comprise detailed event logs or audit trails that may be stored in a logging server (e.g., logging location 108 (FIG. 1)). These logs record significant events related to the object, such as creation, modification, or access.

As shown in FIG. 2B, metadata 208 includes preserved source data and consistent retention data that is preserved during the data migration using supplemental data structure 210. For example, the system may determine object-stored metadata for an object (e.g., metadata 208). The system may then generate an array of the object-stored metadata of that information (e.g., highlighted as supplemental staging data in supplemental data structure 210).

In order to consistently retain metadata 208, the system may generate an array that stores a collection of elements for metadata 208, in a linear, contiguous memory location. For example, the system may use the array to organize and manage metadata 208 in a structured way, allowing for efficient access, retrieval, and manipulation of elements based on their position or index within the array. To improve the efficiency of data retention, the array typically stores elements of the same data type (e.g., integers, floating-point numbers, characters, or objects of a specific class). This homogeneity allows for efficient memory allocation and element access. The system may also use a fixed size array. For example, the size or length of an array may be fixed when it is created. Once an array is created with a specific size, it cannot be resized without creating a new array and copying elements.

As shown in FIG. 2B, the system may generate a hash value for the array. The hash value may be used to ensure (via data validation) that metadata 208 has been preserved. For example, the system may generate a first hash value of a first object-stored metadata. The system may then include the first hash value in supplemental data structure 210. Hashing metadata involves generating a fixed-length string or code (the hash value) from the metadata associated with a digital asset. Hashing is a one-way process, meaning that it is easy to compute the hash value from the metadata, but computationally infeasible to reverse the process and recreate the original metadata from the hash value. To do so, the system may select a cryptographic hash function such as MD5, SHA-1, SHA-256, and SHA-512. Choose a hash function that meets your security and performance requirements. The system may also ensure that the metadata to be hashed in a consistent and well-defined format. This may involve encoding the metadata into a specific character encoding (e.g., UTF-8) and removing any unnecessary whitespace or formatting. The system may then apply the selected hash function to the metadata. The hash function will generate a fixed-length hash value (digest) based on the input metadata.

The system may then validate, using the first hash value, that the first object-stored metadata has been successfully migrated to the target location using the hash. For example, hashing metadata may be used for data integrity verification, digital signatures, and ensuring that metadata remains unaltered during transmission or storage. Validating hashed metadata involves verifying that the metadata has not been tampered with or corrupted during transmission or storage. To do this, the system may compare the computed hash value of the received or stored metadata with a reference hash value (the original hash). If the computed hash matches the reference hash, the metadata is considered valid and unchanged; otherwise, it may have been altered.

As shown in FIG. 2C, metadata 212 may receive a hashed value (e.g., a hash of an array). Metadata 212 may represent metadata received at a target location (e.g., target location 106 (FIG. 1)). The system may compare the hashed value in metadata 212 to the hashed value in supplemental data structure 210 to ensure that the data is consistent. Upon determining that the data is consistent in metadata 212 and/or the data migration is complete. The system may receive a data migration confirmation that the object and the object-stored metadata have been successfully migrated to the target location (e.g., target location 106 (FIG. 1)). The system may then delete the supplemental data structure 210 from a staging location (and/or transfer it to a logging server).

As shown in FIG. 2C, the system may execute a first function that causes the object to be migrated from the source location (e.g., represented by metadata 208 (FIG. 2A)) to the target location (e.g., represented by metadata 212 (FIG. 2C)). The system may perform this by changing a first source identifier in the supplemental data structure 210 (FIG. 2B) to a second source identifier, wherein the second source identifier corresponds to the object at the target location.

For example, the source identifier may be a unique identifier associated with an object. This identifier can be used to distinguish one object from another, especially in scenarios where multiple objects of the same class exist. For example, in a database or data structure, each object could have a unique identifier or key. For example, the source identifier may be a portion of the metadata associated with the object that indicates its source or origin. This metadata could include information about the system, process, or user that created or owns the object.

In some embodiments, the system may also use other types of information in the supplemental data structure to identify object-stored metadata specific to a given object. For example, the system may identify an object at a target location based on a name and content type (e.g., as shown in supplemental data structure 210 (FIG. 2B)).

For example, the system may generate a first name of the first object-stored metadata. The system may include the first name in the first supplemental data structure. The system may, in response to executing the first function, generate a second object at the target location, wherein the second object corresponds to the first object, and wherein the second object comprises a second name. The system may determine that the first supplemental data structure corresponds to the second object based on comparing the first name to the second name. The system may, in response to determining that the first supplemental data structure corresponds to the second object, populate second object-stored metadata for the second object based on the first supplemental data structure.

Additionally or alternatively, the system may generate a first content type of the first object-stored metadata. The system may include the first content type in the first supplemental data structure. The system may, in response to executing the first function, generate a second object at the target location, wherein the second object corresponds to the first object, and wherein the second object comprises a second content type. The system may determine that the first supplemental data structure corresponds to the second object based on comparing the first content type to the second content type. The system may, in response to determining that the first supplemental data structure corresponds to the second object, populate second object-stored metadata for the second object based on the first supplemental data structure.

As shown in FIG. 2C, the system may populate object-stored metadata for an object at the target location based on the supplemental data structure. By doing so, the integrity of the object-stored metadata is preserved. The system then performs the data migration and changes the link in the object identifier from a first object header at the source location to a second object header at the target location as part of the same function as the data migration of the object. Through the use of the supplemental data structure and its transfer via the changing identifier, the object-stored metadata that was stored at the source location is now stored with the object at the target location. Furthermore, the data included in the supplemental data structure is not subject to data migration ingestion procedures at the target location and thus is preserved in its native form. Accordingly, object-stored metadata (e.g., last modified date) remains in its native form (e.g., reflecting the date the data was last modified at the source location) and is not changed based on the ingestion procedure at the target location (e.g., to reflect the date of the data migration).

For example, in response to executing the first function, the system may generate a second object at the target location, wherein the second object corresponds to the first object. The system may populate second object-stored metadata for the second object based on the first object-stored metadata. The system may then validate the second object-stored metadata using a first hash value that was generated based on the first object-stored metadata. The system may then generate for display, on a user interface, a data migration confirmation based on validating the second object-stored metadata using the first hash value, wherein the data migration confirmation indicates that the first object-stored metadata was successfully migrated to the target source.

FIG. 2D shows pseudocode for facilitating data migration, in accordance with one or more embodiments. For example, pseudocode 220 comprises an algorithm that ensures that content is downloaded reliably and metadata is preserved and retrievable. For example, pseudocode 220 implements an algorithm that ensures content is reliably uploaded while preserving metadata and making it retrievable after download. The process begins with the extract_metadata( ) function, which extracts metadata embedded in the last 5000 bytes of a file. It accomplishes this by using tail-c 5000 to retrieve the last portion of the file and applying strings and sed to extract metadata enclosed between the markers S3_START{and}S3_END. This ensures that metadata is preserved within the file structure before uploading.

Before uploading a file, the upload_file( ) function first calls extract_metadata( ) to obtain the metadata. It then creates a temporary file (temp_file) by stripping out the last 5000 bytes (where metadata is stored) using head-c-5000 to ensure that only the actual content is uploaded to S3. If the metadata removal fails, it simply copies the original file. The upload process includes a retry mechanism controlled by MAX_RETRIES, which attempts multiple uploads if any failures occur. If an upload attempt is successful, it logs the completion; otherwise, it logs errors to ERROR_LOG, ensuring traceability and debugging support.

The process_local_files( ) function automates the bulk upload process by iterating through all files in the UPLOAD_DIR. Each file is processed separately and uploaded independently, ensuring that a failure in one file does not halt the entire batch. If an error occurs, the continue statement ensures that the process moves on to the next file, making it highly fault-tolerant.

This approach provides reliability through error handling, logging, and retries, ensuring that transient network failures do not cause permanent data loss. By extracting metadata before upload and ensuring it remains retrievable separately, the system guarantees data integrity and metadata preservation. The structured methodology ensures that uploaded files maintain a clean format without embedded metadata, while metadata remains accessible for future retrieval or reattachment. This design makes the system efficient, scalable, and resilient to failures during file transfer.

In some embodiments, pseudocode 220 may describe an S3 to Local File Sync with Metadata Embedding by implementing a structured and fault-tolerant approach to downloading objects from an S3 bucket, ensuring data integrity, and systematically embedding object metadata into the files. The algorithm follows a step-by-step workflow to achieve reliable synchronization while maintaining metadata consistency. The process begins with initializing the configuration, where AWS credentials, S3 bucket details, region settings, local download directories, an error log, and retry limits are defined. Before proceeding, the system performs a pre-check to ensure that essential tools like the AWS CLI and jq (for JSON parsing) are installed; if any are missing, the process exits with an error to prevent runtime failures. Next, the system creates necessary directories for storing the downloaded files and cleans up old logs to maintain a structured file environment.

The core functionality begins with the download file function, which takes an S3 object key as input, creates required local directories, and then attempts to retrieve the file using AWS S3 CLI commands. To ensure the downloaded file is an exact replica of the stored S3 object, a hash comparison function is executed, verifying that the file remains consistent across different environments.

Metadata retrieval is handled by a fetch metadata function, which queries aws s3api head-object to extract metadata attributes associated with each object. If successful, the metadata is stored in a structured JSON format for further processing. Once the file is downloaded, the embed metadata function appends the metadata at the end of the file (EOF) using a structured format. This ensures that metadata is embedded directly within the file while remaining easy to extract using a metadata parsing function during future retrievals. The system processes all S3 files by iterating through the object list in the bucket. For each object, it follows a structured pipeline by downloading the file, ensuring reliability through retries, retrieving metadata and skipping embedding if metadata retrieval fails, embedding metadata into the file in the defined format, and marking the file as processed, ensuring tracking and preventing duplicate downloads. To maintain data integrity, another hash comparison function is executed after download and metadata embedding, confirming that environmental inconsistencies do not corrupt the file. This S3 to Local Sync process ensures that files are downloaded reliably, remain consistent, and have metadata systematically embedded for future retrieval, providing a structured and fault-tolerant solution for object-to-file system migration while maintaining metadata integrity.

In some embodiments, pseudocode 220 may analyze metadata without downloading the entire file from the target file system, the pseudocode may extract and query metadata directly from the stored files without retrieving the full content. Instead of downloading each file from S3, the system would implement a function that reads only the last portion of the file where the metadata is embedded. This would optimize performance, especially when dealing with large files or cases where metadata analysis is required without the full file content.

The updated pseudocode would introduce a metadata query function that locates the metadata stored at the EOF (end of file) and extracts only the portion between the "S3_START{" and "}S3_END" delimiters. This function would read only a small segment of data (e.g., the last 5000 bytes) using a file seek operation rather than loading the entire file into memory. The function would: open the file in read mode and seek to the last known metadata block; extract the JSON-formatted metadata using the start (S3_START{) and end (}S3_END) delimiters; and parse and return the metadata JSON object for analysis. Additionally, the fetch metadata function would be modified to first check for embedded metadata locally before making an API request to S3. If metadata is found within the file's EOF segment, it would be used instead of querying aws s3api head-object, reducing the need for network calls and improving efficiency.

Furthermore, the system's file processing logic may introduce an option to bypass full file downloads when only metadata analysis is required. Instead of looping through and downloading all files from S3, the system may retrieve file listings from S3, extract and analyze only the metadata from stored files, and download files only if necessary (e.g., if metadata is missing or needs updating). By incorporating this metadata-first approach, the system would significantly reduce data transfer costs, improve performance, and enable fast metadata querying without requiring complete file downloads.

In some embodiments, the system may rehydrate files back into an object store while preserving metadata. For example, the pseudocode may extract embedded metadata from each file, parse it, and store it in the object store's metadata fields before uploading the file. This process ensures that the metadata originally embedded in the file during download is restored as separate object metadata within the object storage system. The updated pseudocode would introduce a metadata extraction function that reads the last segment of the file, specifically looking for the delimiters "S3_START{" and "S3_END", which encapsulate the JSON-formatted metadata. The function may: open the file and seek to the last known metadata block (e.g., the last 5000 bytes); extract the JSON metadata between "S3_START{" and "S3_END" delimiters; parse the extracted metadata into a structured format suitable for object store metadata fields; and once the metadata is extracted, the upload function may modify the existing process to strip the embedded metadata before uploading the file (restoring its original clean format), use the extracted metadata as custom metadata in the object storage API call (e.g., aws s3 cp with —metadata flags for AWS S3 or equivalent for other object stores), and ensure that system-defined metadata fields (such as Content-Type, Last-Modified, and Object Lock settings) are restored accurately.

The pseudocode may iterate through all local files, extract metadata, clean the file of embedded metadata, and upload the file while attaching the metadata fields to the object store. If metadata extraction fails or is missing, it may fall back to default metadata values or previously stored logs to maintain integrity. By implementing this approach, the system enables seamless rehydration of files into object storage, ensuring that both file content and metadata are restored correctly, maintaining consistency between object lifecycle stages. This enhances data portability, metadata integrity, and efficient object recovery from local storage back into an object store.

Figure 3A:
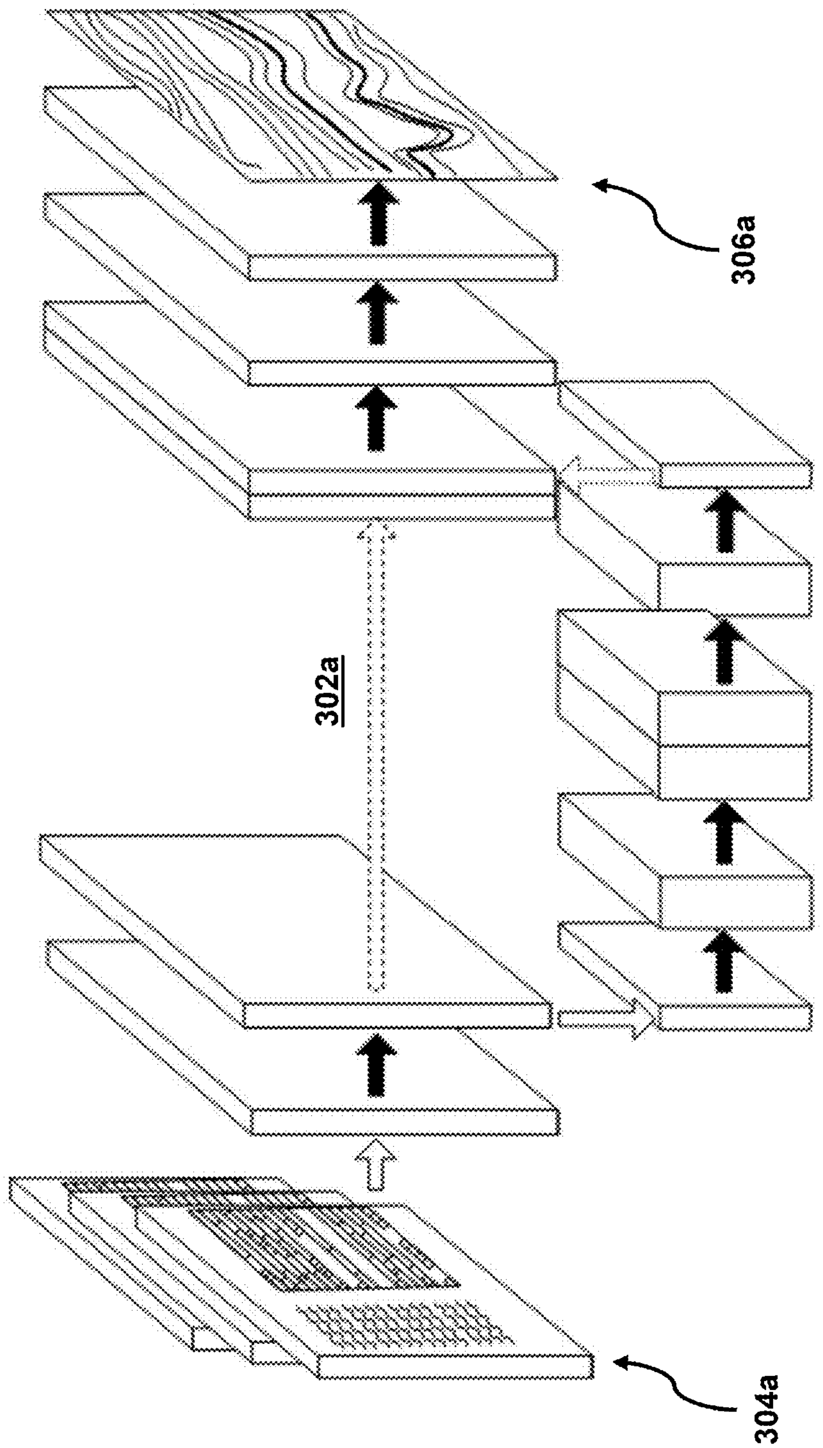
FIGS. 3A-3B show illustrative components for a system used for data migration, in accordance with one or more embodiments.
Figure 3B:
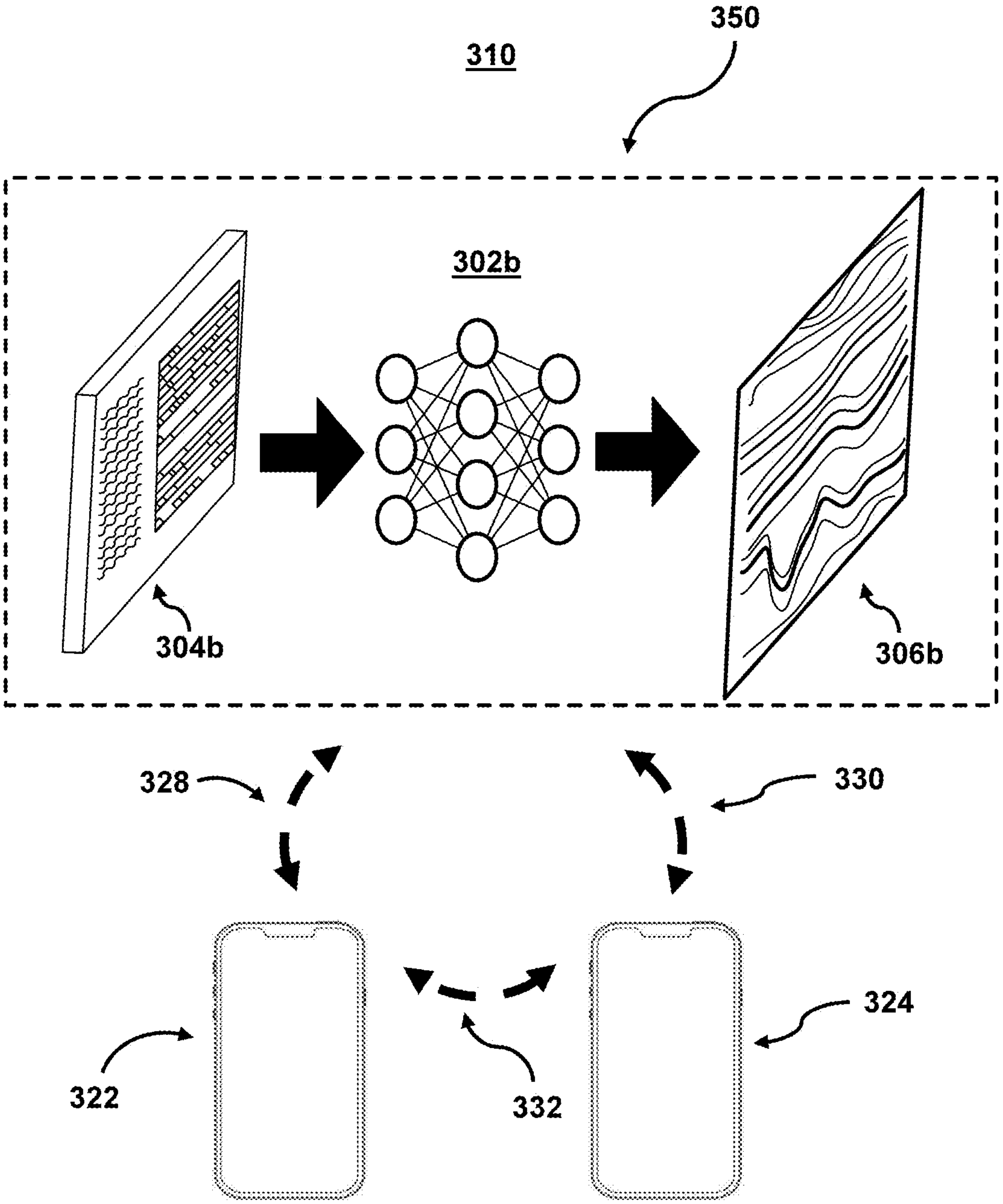

FIGS. 3A-3B show illustrative components for a system used for data migration, in accordance with one or more embodiments. For example, FIG. 3A may represent a model architecture used for data retention while migrating metadata stored in object storage of objects being migrated across container ecosystems.

System 300 also includes model 302*a*, which may be a machine learning model, artificial intelligence model, etc. (which may be referred to collectively as "models" herein). Model 302*a* may take inputs 304*a* and provide outputs 306*a*. The inputs may include multiple datasets, such as a training dataset and a test dataset. Each of the plurality of datasets (e.g., inputs 304*a*) may include data subsets related to user data, predicted forecasts and/or errors, and/or actual forecasts and/or errors. In some embodiments, outputs 306*a* may be fed back to model 302*a* as input to train model 302 (e.g., alone or in conjunction with user indications of the accuracy of outputs 306*a*, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a supplemental data structure, migration function, an array, etc.).

In a variety of embodiments, model 302*a* may update its configurations (e.g., weights, biases, or other parameters) based on the assessment of its prediction (e.g., outputs 306*a*) and reference feedback information (e.g., user indication of accuracy, reference labels, or other information). In a variety of embodiments, where model 302*a* is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302*a* may be trained to generate better predictions.

In some embodiments, the model (e.g., model 302*a*) may automatically perform actions based on outputs 306. In some embodiments, the model (e.g., model 302*a*) may not perform any actions. The output of the model (e.g., model 302*a*) may be used to determine a supplemental data structure, migration function, an array, etc.

FIG. 3B shows illustrative components for a system used for data migration, in accordance with one or more embodiments. For example, FIG. 3B may show illustrative components for retention of data while migrating metadata, stored in object storage of objects being migrated, across container ecosystems to preserve the data for artificial intelligence applications. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a user interface upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically store information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API ("application programming interface") layer 350. API layer 350 may allow the system to generate summaries across different devices. In some embodiments, API layer 350 may be implemented on mobile device 322 or mobile device 324. Alternatively or additionally, API layer 350 may reside on one or more of system 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

For example, in some embodiments, executing a function (e.g., a function to perform a data migration) may comprise generating an API request or multiple API requests. For example, the system may determine a first API for a target location. The system may then generate a first API request, using the first API, wherein the first API request communicates the first object from the source location to the target location. The system may then generate a second API request, using the first API, wherein the second API request communicates the first object-stored metadata from the staging location to the target location.

In some embodiments, the system may receive a notification that the first function is executed. The system may, in response to receiving the notification, execute a second function that causes the first object-stored metadata to be migrated from the staging location to the target location based on the second source identifier.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model **302*b* may be trained by taking inputs 304*b* and providing outputs 306*b*. Model 302*b* may include an artificial neural network. In such embodiments, model 302*b* may include an input layer and one or more hidden layers. Each neural unit of model 302*b* may be connected with many other neural units of model 302*b*. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302*b* may be self-learning and trained, rather than explicitly programmed, and can perform significantly better in certain areas of problem solving, as compared to traditional computer programs. During training, an output layer of model 302 may correspond to a classification of model 302*b*, and an input known to correspond to that classification may be input into an input layer of model 302*b*** during training. During testing, an input without a known classification may be input into the input layer, and a determined classification may be output.

In some embodiments, model **302*b* may include multiple layers (e.g., where a signal path traverses from front layers to back layers). In some embodiments, back propagation techniques may be utilized by model 302*b* where forward stimulation is used to reset weights on the "front" neural units. In some embodiments, stimulation and inhibition for model 302 may be more free-flowing, with connections interacting in a more chaotic and complex fashion. During testing, an output layer of model 302*b* may indicate whether or not a given input corresponds to a classification of model 302***b* (e.g., a supplemental data structure, migration function, an array, etc.).

Model 302*b* is shown as a convolutional neural network. A convolutional neural network consists of an input layer (e.g., input 304*a*), hidden layers, and an output layer (e.g., output 306*b*). As shown in FIG. 3B, the middle layers are called hidden because their inputs and outputs are masked by the activation function and final convolution. In a convolutional neural network, the hidden layers include layers that perform convolutions. Model 302*b* may comprise convolutional layers that convolve the input and pass its result to the next layer. Model 302*b* includes local and/or global pooling layers along with traditional convolutional layers. Pooling layers reduce the dimensions of data by combining the outputs of neuron clusters at one layer into a single neuron in the next layer. Also as shown, model 302*b* may comprise fully connected layers that connect every neuron in one layer to every neuron in another layer.

Figure 4:
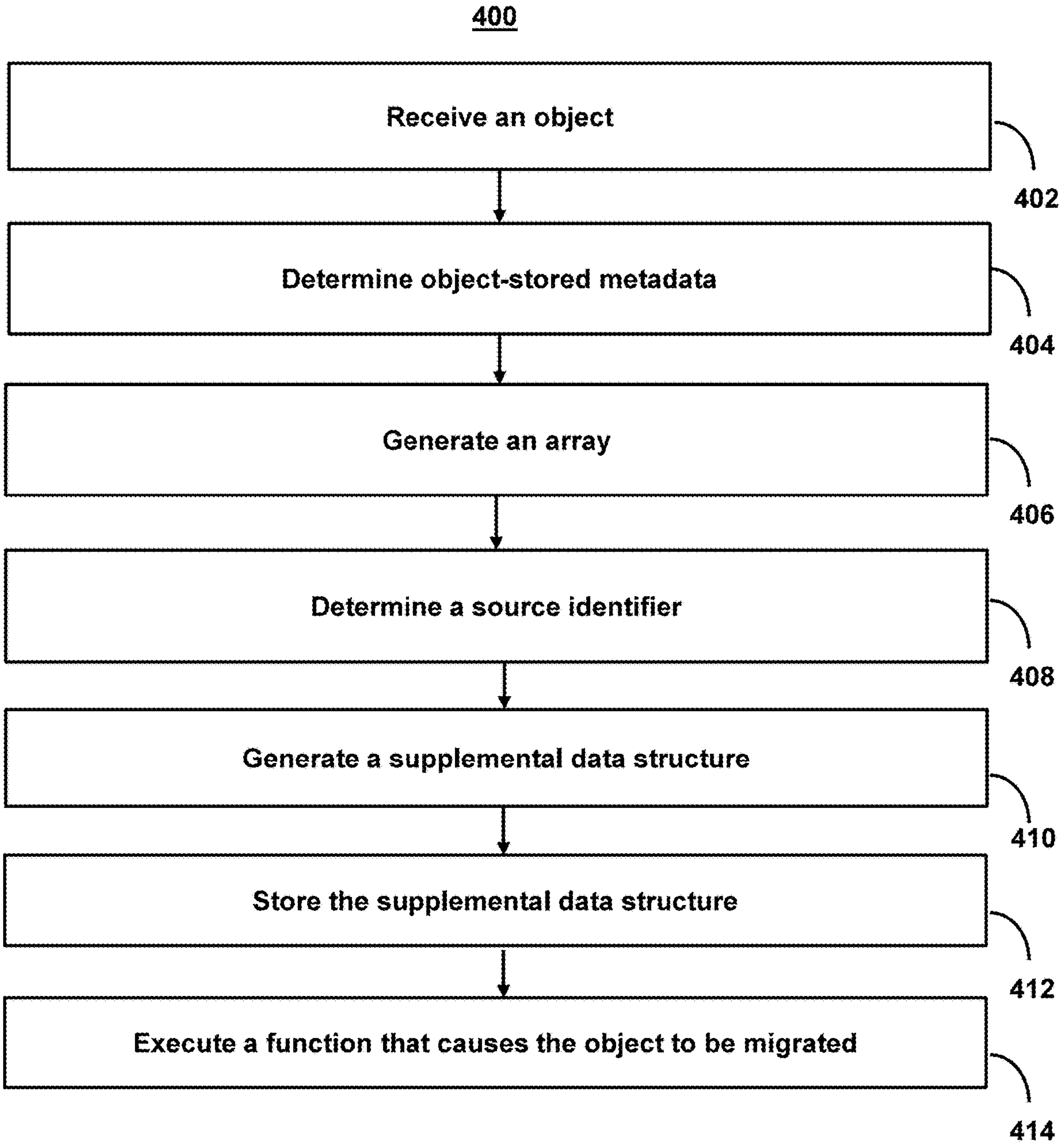
FIG. 4 shows a flowchart of the steps involved in migrating metadata stored in object storage of objects, in accordance with one or more embodiments.

FIG. 4 shows a flowchart of the steps involved in migrating metadata stored in object storage of objects, in accordance with one or more embodiments. For example, the system may use process 400 (e.g., as implemented on one or more system components described above) for retention of data while migrating metadata, stored in object storage of objects being migrated, across container ecosystems to preserve the data for artificial intelligence applications.

At step 402, process 400 (e.g., using one or more components described above) receives an object. For example, the system may receive a first object, at a source location, for migration to a target location. For example, the first object may be included in a subset of data at a source location that is designated to be a part of a data migration.

At step 404, process 400 (e.g., using one or more components described above) determines object-stored metadata. For example, the system may determine first object-stored metadata for the first object. For example, object-stored metadata may refer to additional information or attributes associated with an object that are stored alongside the object itself. Notably, object-stored metadata is typically deleted and/or modified in a conventional data migration process.

At step 406, process 400 (e.g., using one or more components described above) generates an array. For example, the system may generate an array of the first object-stored metadata. The array may codify object-stored metadata such that it is not changed or deleted during the migration process. For example, the array may comprise key-value pairs, where each key corresponds to a specific attribute or property, and the associated value provides information about that attribute. For example, the system may generate metadata keys for "title," "author," "creation date," "content type," etc. The array then codifies these metadata keys to ensure that the values are not changed. Moreover, the system may generate new object-stored metadata (e.g., for a new object at a target location) based on the metadata keys.

Additionally or alternatively, the system may include new metadata that was not found in the original object-stored metadata (e.g., for an object at a source location). The new metadata may include additional attributes and/or rules (e.g., retention rules) that are applied to the new object. For example, the system may generate a third object-stored metadata for the first object, wherein the third object-stored metadata is not included in the first object-stored metadata. The system may include the third object-stored metadata in the first supplemental data structure. In response to executing the first function, the system may generate a second object at the target location, wherein the second object corresponds to the first object, and wherein the second object comprises the third object-stored metadata.

For example, a data retention rule for objects may be a predefined policy or set of guidelines that specifies how long data objects should be retained and under what conditions they should be deleted or archived. Data retention rules are a crucial aspect of data management and compliance, helping organizations manage data in a way that aligns with legal, regulatory, and business requirements. The data retention rule may comprise a retention period (e.g., a duration for which objects should be retained), archiving rules (e.g., rules that specify that objects should be archived rather than deleted), and/or deletion rules (e.g., rules that may specify when objects should be deleted after the retention period has passed).

In some embodiments, the system may compare metadata in a supplemental data structure to metadata generated at a target location as part of a data migration. For example, if an object has a "last modified" date generated as part of a data migration to a target location, the system may compare this value to values from another category in the supplemental data structure. In response to an inconsistency, the system may use the value from the supplemental data structure. For example, the system may compare fourth object-stored metadata to the third object-stored metadata, wherein the fourth object-stored metadata is generated at the target location in response to migrating the first object. The system may determine an inconsistency between the fourth object-stored metadata and the third object-stored metadata. The system may modify the fourth object-stored metadata based on the inconsistency.

At step 408, process 400 (e.g., using one or more components described above) determines a source identifier. For example, the system may determine a first source identifier, wherein the first source identifier corresponds to the first object at the source location. In some embodiments, the source identifier may comprise a name, content type, and/or other information to identify as object corresponding to supplemental data structures.

At step 410, process 400 (e.g., using one or more components described above) generates a supplemental data structure. For example, the system may generate a first supplemental data structure comprising the array and the first source identifier. The supplemental data structure may be used to house (in a format that avoids changes and/or deletion) object-stored metadata for the object.

At step 412, process 400 (e.g., using one or more components described above) stores the supplemental data structure. For example, the system may store the first supplemental data structure at a staging location. By storing the supplemental data structure at the staging location, the system may avoid the supplemental data structure from being affected by any data migration procedures and/or protocols for at the target source that may affect the data.

In some embodiments, storing the supplemental data structure at the staging location allows for the staging location to perform any formatting and/or pre-processing requirements. For example, the system may determine a compatibility requirement of the target location. The system may format the first supplemental data structure based on the compatibility requirement.

At step 414, process 400 (e.g., using one or more components described above) executes a function that causes the object to be migrated. For example, the system may execute a first function that causes the first object to be migrated from the source location to the target location and changes the first source identifier in the first supplemental data structure to a second source identifier, wherein the second source identifier corresponds to the first object at the target location.

For example, by performing the data migration by changing the link in the object identifier from a first object header at the source location to a second object header at the target location as part of the same function as the data migration of the object, the object-stored metadata that was stored at the source location is now stored with the object at the target location. Furthermore, the data included in the supplemental data structure is not subject to data migration ingestion procedures at the target location and thus is preserved in its native form. Accordingly, object-stored metadata (e.g., last modified date) remains in its native form (e.g., reflecting the date the data was last modified at the source location) and is not changed based on the ingestion procedure at the target location (e.g., to reflect the date of the data migration).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
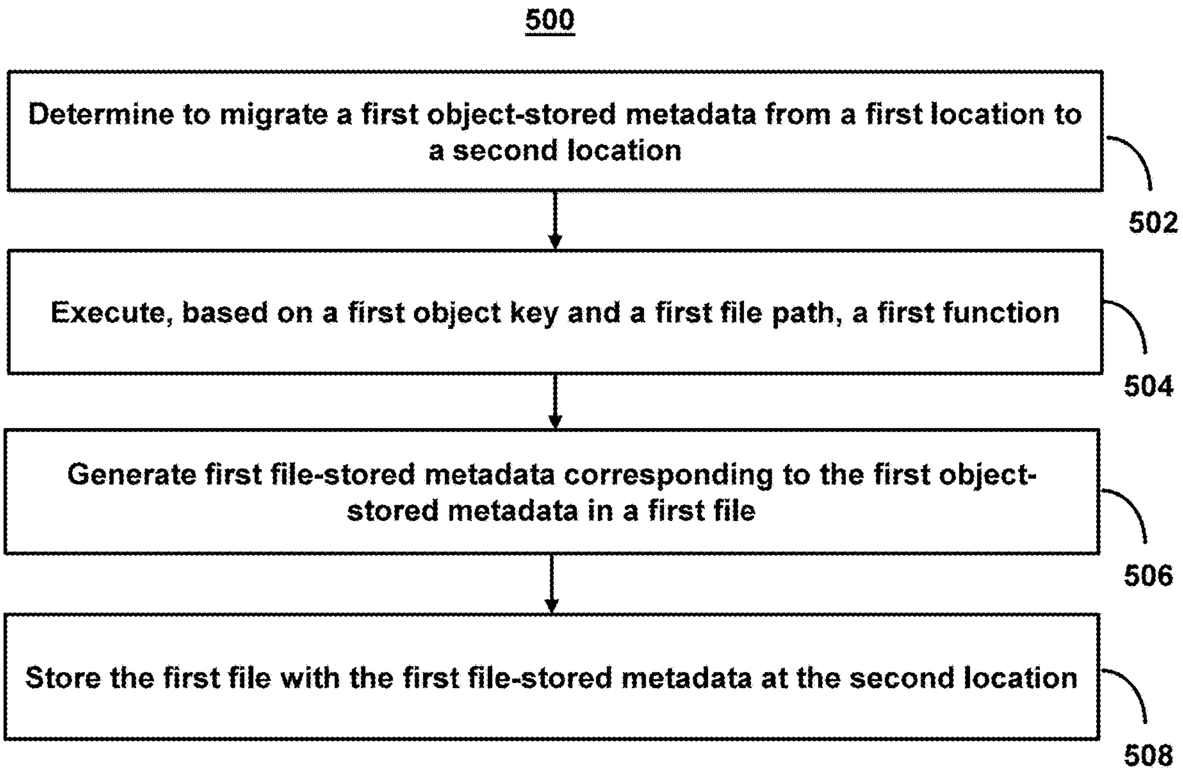
FIG. 5 shows a flowchart of the steps involved in migrating object-stored metadata, in accordance with one or more embodiments.

FIG. 5 shows a flowchart of the steps involved in migrating object-stored metadata, in accordance with one or more embodiments. For example, the system may use process 500 (e.g., as implemented on one or more system components described above) for retention of data while migrating object-stored metadata from an object storage platform to a file storage platform. As one example, the system may receive a data request for data of a first type for a first application and determine that first object-stored metadata corresponds to the first type, wherein the first object-stored metadata corresponds to a first object stored at a first location.

For example, the system may receive a data request for data of a first type by monitoring incoming API calls, service queries, or user-initiated actions targeting a specific application—in this case, the first application. The request may specify parameters such as data type, context, or usage requirements, indicating that the system should retrieve metadata or data records matching the first type. Upon receiving this request, the system initiates a metadata lookup process by querying its object storage metadata index or metadata service layer, which maintains mappings between stored objects and their associated metadata. Using the type identifier from the request, the system scans metadata entries to determine which ones match the requested first type. It then identifies a specific first object-stored metadata entry that matches the criteria. This metadata entry is linked to a first object—a file or data asset—stored at a first location in object storage. The metadata may include properties such as content type, tags, creation date, or custom attributes that align with the requested type. By matching these attributes with the request parameters, the system confirms that the object-stored metadata corresponds to the data of the first type. Once the correspondence is established, the system either retrieves the associated metadata for inspection or proceeds to access the actual object from its storage location, depending on the intent of the request. This process allows the system to fulfill the request efficiently without needing to download or scan the entire object, leveraging the metadata abstraction layer to isolate and identify relevant objects based on type or context.

At step 502, process 500 (e.g., using one or more components described above) determines to migrate a first object-stored metadata from a first location to a second location. For example, the system may receive a first request to migrate first object-stored metadata for a first object from a first location to a second location, wherein the first location comprises object storage, and wherein the second location comprises file storage. The system may receive a first request to migrate first object-stored metadata for a first object from a first location to a second location as part of a data migration or synchronization process between storage platforms. In this context, the first location refers to object storage, where the object and its metadata are managed separately, while the second location refers to file storage, where metadata must typically be stored within the file itself or in an accompanying file. The system may receive this request through an API call, configuration trigger, user interface command, or scheduled task, instructing it to migrate both the object data and its associated metadata.

Upon receiving the request, the system identifies the target object within the object storage environment using its object key or unique identifier. It then queries the object storage system to retrieve the object-stored metadata, which typically includes system-defined fields (such as content type, last modified date, and encryption settings) and user-defined key-value pairs. The system prepares this metadata for migration by converting it into a structured format—commonly JavaScript Object Notation (JSON)—to ensure compatibility with the file storage environment. It then proceeds to embed or associate this metadata with the file during the transfer process, ensuring that the metadata remains accessible and traceable after migration. This approach allows the system to preserve the semantic and operational value of object-stored metadata even in storage environments that do not natively support external metadata.

In some embodiments, the system may receive the first request to migrate the first object-stored metadata by receiving a first data criteria for a first application and determining that the first object corresponds to the first data criteria. For example, the system may receive the first request to migrate the first object-stored metadata by first receiving a data criteria specification related to a first application. This data criteria may be defined through an API call, configuration file, user input, or scheduled policy and could include parameters such as application name, data type, tags, creation date ranges, or custom metadata values. The system uses this data criteria to identify which objects within the object storage environment are relevant to the migration task. It then queries the object storage metadata index or catalog and evaluates stored metadata for each object to determine if it matches the provided criteria. When the system finds that a first object corresponds to the first data criteria, such as being tagged with the application's identifier or falling within a specified timestamp range, it flags the object for migration. This match effectively acts as a trigger for initiating the metadata migration process. From there, the system proceeds to retrieve the first object-stored metadata, convert it into a compatible format—such as JSON—and prepare it for transfer to the target file storage environment. This logic allows the system to intelligently and selectively migrate metadata associated with application-specific data, ensuring efficient and criteria-based handling of storage transitions.

In some embodiments, the system may receive the first request to migrate the first object-stored metadata by receiving a second request for training data of a first type for an artificial intelligence model, wherein the training data comprises object metadata and, in response to the second request, determining that the first object-stored metadata corresponds to the first type. For example, the system may receive the first request to migrate the first object-stored metadata as a result of processing a second request for training data of a first type intended for use with a model. This second request, which may come from a user, an API call, or an automated pipeline, specifics criteria for the training data—such as metadata type, application domain, content format, or labeling attributes—indicating that the required training data must include object metadata of a particular kind. Upon receiving this second request, the system queries its object storage metadata index to evaluate and identify metadata entries that meet the specified type. Through this evaluation, the system determines that the first object-stored metadata corresponds to the first type of training data requested. This correspondence is based on matching characteristics such as metadata keys, tag values, content type, or system-defined attributes. Once the match is confirmed, the system interprets this as an implicit first request to migrate the matched object metadata. In response, it extracts the relevant metadata from the object storage system—without downloading the full object—and prepares it for migration to a target location, such as a file-based training dataset or metadata repository. This enables the system to dynamically fulfill AI training data requests by selectively identifying and migrating metadata that aligns with the required training data type, ensuring that relevant metadata is available for model training without unnecessary data movement.

At step 504, process 500 (e.g., using one or more components described above) executes, based on a first object key and a first file path, a first function. For example, the system may, in response to the first request, initialize a configuration for migrating the first object-stored metadata from the first location to the second location by determining a first object key for the first object-stored metadata at the first location and determining a first file path to a first file at the second location. In response to the first request to migrate the first object-stored metadata from the first location (object storage) to the second location (file storage), the system begins by initializing a configuration that sets the parameters for the migration process. This involves first determining a first object key that uniquely identifies the object within the object storage environment. The object key serves as a reference for retrieving both the object's data and its associated metadata from the source system. Using this key, the system can perform metadata queries, such as issuing a head-object command in AWS S3, to extract the object-stored metadata without downloading the full object.

Next, the system determines a first file path at the second location where the metadata—and potentially the object itself—will be stored in the file storage system. This file path is typically derived from the object key, often by transforming the key into a valid file system path while preserving its hierarchical or naming structure to maintain traceability. For example, an object key like app1/data/training/sample.json might be mapped to a file path such as /mnt/files/app1/data/training/sample.json. This mapping ensures that metadata can be embedded into the corresponding file in a consistent and organized manner. Together, the determination of the object key and the file path allows the system to fully define the migration context, enabling it to carry out the metadata extraction, formatting, and embedding steps needed to reliably preserve object-stored metadata within the file system.

In some embodiments, the system may initialize the configuration by retrieving first credentials for the first object and providing the first credentials to the first location. The system initializes the configuration for migrating the first object-stored metadata by first retrieving the first credentials required to access the first object in the first location, which comprises an object storage platform. These credentials typically include authentication and authorization details, such as an access key, secret key, session token, or identity role, depending on the security model of the storage provider (e.g., AWS IAM credentials for S3). The credentials may be retrieved from a secure credentials manager, environment variables, configuration file, or secrets vault, ensuring they are handled securely and not exposed in plain text during the process. Once the credentials are retrieved, the system provides the first credentials to the first location by initializing a secure session or connection using the storage platform's access protocol—such as through a command-line interface (CLI), SDK, or RESTful API. This authenticated session allows the system to issue authorized requests to the object storage service, such as querying metadata, listing objects, or retrieving object keys. By securely retrieving and supplying the correct credentials as part of configuration initialization, the system ensures that it has the necessary permissions to access and migrate the first object-stored metadata without compromising security or data integrity. This step forms a foundational part of the metadata migration process, enabling controlled and authenticated interaction with the source storage environment.

In some embodiments, the system may initialize the configuration by receiving a first directory for the first location and using the first directory to determine the first object key. For example, the system initializes the configuration by receiving a first directory that corresponds to the first location, which is an object storage environment. This directory may be specified as part of the migration request, configuration settings, or user input, and it represents a logical prefix or path-like structure within the object storage system—similar to a folder in a file system, even though object storage is typically flat. Upon receiving this first directory, the system uses it as a namespace or prefix filter to identify objects stored under that directory structure.

To determine the first object key, the system queries the object storage platform using the first directory as a search scope—commonly by listing all objects with keys that start with the given prefix. For example, if the first directory is "app1/data/training/", the system may identify an object key such as "app1/data/training/file1.json" as matching the directory. The object key uniquely identifies the object within the object store and is required for operations such as metadata retrieval, downloading, or further migration steps. By receiving the first directory and using it to locate and resolve object keys, the system establishes the linkage between directory-based navigation and object-based addressing, enabling it to accurately target and migrate the corresponding object-stored metadata.

In some embodiments, the system may initialize the configuration by determining whether a second directory exists at the second location for receiving the first object-stored metadata. Based on determining whether the second directory exists at the second location for receiving the first object-stored metadata, the system may determine whether to create a new directory or use an existing directory. The system initializes the configuration by first determining whether a second directory exists at the second location, which is designated for receiving the first object-stored metadata. This second location typically refers to a file storage environment, where metadata will be embedded into a corresponding file. During initialization, the system checks if the target directory path—derived from the object key or a configured directory structure—already exists in the local or mounted file system. This check is critical to ensure that the system can correctly write the migrated metadata to the appropriate location. Based on the outcome of this check, the system then decides whether to create a new directory or use an existing one. If the directory does not exist, the system automatically creates the required directory structure, ensuring the path is valid and writable before proceeding with the migration. If the directory already exists, the system reuses it, avoiding redundant operations and maintaining consistency with previous data or metadata stored in that location. This conditional handling of the directory ensures that the migration process is both flexible and robust, capable of adapting to different storage environments and preventing errors that could arise from missing or misconfigured paths.

In some embodiments, the system may execute the first function by determining a first API for the second location and generating a first API request using the first API, wherein the first API request communicates the first request to the second location. For example, the system may execute the first function by first determining a first API that is compatible with the second location, which is typically a file storage system or an associated service capable of receiving metadata. This API may be part of a local file handling interface, a metadata management service, or a cloud file storage gateway that exposes endpoints for writing data and metadata. Once the appropriate API is identified, the system then generates a first API request using the specifications and parameters required by that API. This API request is constructed to communicate the first request—which is to migrate the first object-stored metadata—to the second location. The system includes in the request all necessary details, such as the target file path, metadata content (e.g., in JSON format), and instructions for whether the metadata should be embedded into the file or stored separately. The request may also include authentication tokens, content-type headers, and other protocol-specific information to ensure successful communication. By generating and sending this API request, the system triggers the appropriate operation in the second location, such as creating or updating a file with metadata, thus carrying out the first function of the metadata migration workflow in a programmatically controlled and structured manner.

At step 506, process 500 (e.g., using one or more components described above) generates the first file-stored metadata corresponding to the first object-stored metadata in a first file. For example, the system, based on the first function, may generate the first file-stored metadata corresponding to the first object-stored metadata in the first file. For example, after retrieving the object—stored metadata-typically structured as key-value pairs through an API such as head-object in object storage platforms like AWS S3—the system serializes this metadata into a standardized, portable format, commonly JavaScript Object Notation (JSON). This format ensures compatibility and case of parsing across different environments and systems. The system then appends or embeds the JSON-formatted metadata into the first file, following a defined structure to distinguish it from the file's primary content. This may involve writing the metadata at the end of the file (EOF), wrapped between clearly marked delimiters such as "S3_START{" and "}S3_END", or storing it in a companion sidecar file (e.g., filename.metadata.json) placed alongside the main file. This process effectively converts the original object-stored metadata into file-stored metadata, making it self-contained and portable within the file-based storage system. By doing so, the system ensures that important metadata such as content type, last modified date, tags, and user-defined attributes are preserved and retrievable, even after migrating away from object storage.

In some embodiments, the system may generate the first file-stored metadata by generating a first hash value of the first object-stored metadata, including the first hash value in the first file, and validating, using the first hash value, that the first object-stored metadata has been successfully migrated to the second location. The system generates the first file-stored metadata by first computing a first hash value of the first object-stored metadata to ensure integrity and traceability during the migration process. This begins with the system retrieving the object-stored metadata—typically a collection of key-value pairs—and serializing it into a consistent format such as JSON. The system then applies a hashing algorithm (e.g., SHA-256) to this serialized metadata to generate a unique and deterministic hash value, which serves as a digital fingerprint of the metadata content.

Once the hash value is generated, the system embeds both the metadata and the hash value into the first file at the second location (file storage). The metadata and its hash may be written at the end of the file or within a defined metadata section, enclosed by recognizable delimiters such as "S3_START{" and "}S3_END". The inclusion of the hash value alongside the metadata allows the system to later validate that the metadata was migrated accurately and without alteration. After migration, the system can independently recompute the hash of the embedded file-stored metadata and compare it to the originally stored hash value. If the two values match, the system confirms that the first object-stored metadata has been successfully and accurately migrated to the second location. This process adds a layer of verification and integrity checking, ensuring that metadata is not only transferred but also preserved exactly as it existed in the source environment.

In some embodiments, the system may generate the first file-stored metadata by retrieving a first boundary condition for the first file, wherein the first boundary condition indicates an internal location for injecting the first file-stored metadata into the first file and injecting the first file-stored metadata into the first file based on the first boundary condition. For example, the system may generate the first file-stored metadata by first retrieving a first boundary condition for the first file, which specifies the internal location within the file where metadata should be injected. This boundary condition may be defined by the file format, a predefined offset, or application-specific markers that designate safe regions for inserting metadata without corrupting or interfering with the file's primary content. For example, the boundary condition could be the end of the file (EOF), a reserved metadata block at the beginning, or a custom delimiter embedded within the file. Once the boundary condition is identified, the system uses it to determine the exact insertion point and proceeds to inject the first file-stored metadata—typically serialized in a format such as JSON—into the file at that location. To ensure the metadata is distinguishable and retrievable, it may be wrapped in unique markers such as "S3_START{" and "}S3_END", clearly separating it from the file's native content. By following the defined boundary condition, the system preserves the integrity and usability of the original file while embedding the metadata in a structured and consistent manner. This approach allows metadata to travel with the file across different environments and be parsed or validated later, supporting metadata-aware workflows even in systems that do not natively support separate metadata storage.

In some embodiments, the system may generate the first file-stored metadata by retrieving a first content condition for the first file, wherein the first content condition indicates a content constraint for injecting the first file-stored metadata into the first file and injecting the first file-stored metadata into the first file based on a content of the first file-stored metadata corresponding to the first content condition. For example, the system may generate the first file-stored metadata by first retrieving a first content condition for the first file, which defines a content-based constraint that must be satisfied before metadata can be injected. This first content condition may specify requirements related to the file's structure, keywords, and/or other characters (e.g., restricting obscene, privacy-protected, and/or other information) format, encoding, or allowable content regions to ensure that embedding metadata does not corrupt or conflict with the primary file data. For example, the condition might dictate that metadata can only be injected if the file is in a text-based format, if there is sufficient padding space, or if the file supports custom tags or sections reserved for metadata. After retrieving this condition, the system evaluates whether the content of the first file-stored metadata complies with the constraint. This includes checking for compatible formats (e.g., JSON), acceptable size limits, or safe character encoding. If the metadata content meets the requirements defined by the first content condition, the system proceeds to inject the metadata into the file accordingly. The injection may occur at a specific offset, within a reserved section, or appended to the end of the file with distinguishing markers such as "S3_START{" and "}S3_END" to ensure retrievability. By applying content-based constraints, the system ensures that metadata embedding is performed safely and compatibly, preserving the functional integrity of the file while still enabling metadata portability. This method allows the system to support varied file types and content structures, providing a reliable way to migrate and preserve object-stored metadata in file-based environments without risking data corruption.

In some embodiments, the system may generate the first file-stored metadata by retrieving a first size condition for the first file, wherein the first size condition indicates a size constraint for injecting the first file-stored metadata into the first file and injecting the first file-stored metadata into the first file based on a size of the first file-stored metadata corresponding to the first size condition. For example, the system generates the first file-stored metadata by first retrieving a first size condition for the first file, which specifies a size constraint that governs whether and how metadata can be injected into the file. This size condition defines limitations such as the maximum allowable size of the metadata block, the total file size threshold after injection, or alignment requirements that must be respected to maintain compatibility with file formats or application expectations. The system uses this condition to determine whether the metadata—once serialized, typically as JSON—is small enough to be safely embedded without exceeding file size limits or disrupting expected content boundaries. After retrieving and evaluating the size condition, the system measures the actual size of the first file-stored metadata and compares it against the defined constraint. If the metadata size falls within the acceptable range specified by the condition, the system proceeds to inject the metadata into the first file. This injection is typically performed at the end of the file or another predefined location, using clear delimiters (such as "S3_START{" and "}S3_END") to separate the metadata from the file's primary content. If the size condition is not met—meaning the metadata is too large—the system may skip injection, truncate metadata, or log a warning for further action. By enforcing size-based constraints, the system ensures that metadata embedding does not cause file corruption, exceed platform limitations, or violate format-specific restrictions. This approach allows the system to maintain file integrity and compatibility while still preserving essential metadata during migration from object storage to file storage.

In some embodiments, the system may generate the first file-stored metadata by retrieving a first format condition for the first file, wherein the first format condition indicates a format constraint for injecting the first file-stored metadata into the first file and injecting the first file-stored metadata into the first file based on a current format of the first file-stored metadata corresponding to the first format condition. For example, the system may generate the first file-stored metadata by first retrieving a first format condition for the first file, which defines a format constraint specifying the acceptable structure or encoding required for injecting metadata into the file. This first format condition ensures that metadata can be embedded without violating the file's format specifications, which is especially important for files that adhere to strict content schemas, binary layouts, or proprietary formatting standards. For example, the format condition might require that metadata be in JSON, XML, or a binary-safe encoded format, depending on the file type—such as plain text, PDF, image, or audio. Once the format condition is retrieved, the system examines the current format of the first file-stored metadata and verifies that it aligns with the format constraint. If the format matches—for instance, if the metadata is already in the required JSON format—the system proceeds to inject the metadata into the first file in a manner that conforms to the file's formatting rules. This injection typically occurs at a safe location, such as the end of the file, and is clearly delimited using recognizable markers like "S3_START{" and "}S3_END" to differentiate the metadata from the file's native content. If the metadata format does not comply with the format condition, the system may convert or reformat the metadata accordingly before proceeding with the injection. By validating the format prior to insertion, the system ensures that metadata embedding is both safe and compatible with the destination file, preventing data corruption and preserving application compatibility. This approach allows the system to support a wide range of file types while still maintaining the integrity and usability of both the file and its embedded metadata.

In some embodiments, the system may generate the first file-stored metadata by retrieving a first time condition for the first file, wherein the first time condition indicates a time constraint for injecting the first file-stored metadata into the first file and injecting the first file-stored metadata into the first file based on a current time corresponding to the first time condition. For example, the system may generate the first file-stored metadata by first retrieving a first time condition for the first file, which specifies a time-based constraint that governs when metadata can be injected into the file. This first time condition may define parameters such as a permissible time window, a required delay before modification, or a restriction that metadata can only be embedded if the file was created, modified, or accessed within a certain timeframe. For instance, the time condition might specify that metadata should only be injected during off-peak hours, after a file has aged beyond a specific threshold, or before a particular expiration timestamp. Once the time condition is retrieved, the system compares it to the current time or the file's timestamp metadata, such as creation time, last modified time, or last access time. If the current time satisfies the constraint—indicating that it is a valid moment to perform the operation—the system proceeds to inject the first file-stored metadata into the file. This metadata is typically serialized in a structured format like JSON and inserted at a predefined location such as the end of the file, often marked with clear delimiters such as "S3_START{" and "}S3_END" to distinguish it from the file's main content. If the current time does not meet the time condition, the system may delay the injection, skip the file, or queue the operation for later processing. By enforcing time-based conditions, the system can coordinate metadata embedding with operational policies, backup schedules, or system load balancing strategies, ensuring that the process occurs at the most appropriate and efficient time. This approach supports controlled and predictable file modifications, especially in environments with strict compliance, performance, or workflow timing requirements.

In some embodiments, the system may generate the first file-stored metadata by retrieving a first geographic condition for the first file, wherein the first geographic condition indicates a geographic constraint for injecting the first file-stored metadata into the first file and injecting the first file-stored metadata into the first file based on the second location corresponding to the first geographic condition. For example, the system may generate the first file-stored metadata by first retrieving a first geographic condition for the first file, which specifies a geographic constraint governing whether or where metadata can be injected into the file. This first geographic condition may relate to data residency, compliance, or regional policy requirements, such as restrictions that metadata can only be injected when the file is stored or processed in a specific geographic region—e.g., within a particular country, cloud region, data center, or legal jurisdiction. The system evaluates the second location, which refers to the destination file storage environment, to determine whether it corresponds to the geographic condition. This may involve checking the physical or logical location of the storage infrastructure, the configured region of a cloud-based file system, or GPS-based location metadata associated with the storage environment. If the second location satisfies the geographic condition—meaning it aligns with the required region specified in the constraint—the system proceeds to inject the first file-stored metadata into the file. The metadata, typically formatted in JSON, is embedded at a designated location within the file (such as the end of the file) and marked with delimiters like "S3_START{" and "}S3_END" to maintain clear separation from file content. If the second location does not meet the geographic condition, the system may defer the injection, reroute the file to a compliant region, or log a compliance violation depending on the policy enforcement rules in place. By enforcing geographic constraints, the system ensures that metadata embedding complies with regional data governance policies, regulatory frameworks (such as GDPR or data sovereignty laws), and enterprise-specific location controls. This capability is particularly important in multi-region or cloud-native environments where different storage nodes or services may operate under varying legal and operational requirements.

At step 508, process 500 (e.g., using one or more components described above) stores the first file with the first file-stored metadata at the second location. For example, the system may store the first file with the first file-stored metadata at the second location. The system may store the first file with the first file-stored metadata at the second location, which comprises a file storage environment, by writing the file—including its embedded metadata—to the appropriate directory or file path determined during configuration. After the metadata has been prepared—typically formatted as structured data such as JSON and injected into the file at a designated location, such as the end of the file—the system ensures that the complete, modified file is written to the target file path at the second location. This storage operation may be carried out using local file system write operations or through an interface to a network-mounted file share, depending on the underlying infrastructure. The metadata may be enclosed with unique delimiters (e.g., "S3_START{" and "}S3_END") to clearly separate it from the file's primary content, ensuring it remains retrievable and distinguishable for future processing or reverse migration. Before completing the write operation, the system may also verify the validity of the file path, confirm directory permissions, and optionally perform a post-write integrity check—such as hashing—to ensure the file and its metadata were stored correctly. By embedding and storing the file-stored metadata in this way, the system preserves the object's descriptive information alongside its content in a portable, self-contained format that can be accessed or rehydrated later, even in environments that do not natively support external metadata.

In some embodiments, the system may store the first file with the first file-stored metadata at the second location by receiving a data migration confirmation that the first object-stored metadata have been successfully migrated to the second location and deleting the first object-stored metadata from the first location. For example, the system may store the first file with the first file-stored metadata at the second location by completing the data migration process and performing post-migration cleanup. After injecting the object-stored metadata into the first file and writing the file to the second location—typically a file system—the system awaits a data migration confirmation, which verifies that the first object-stored metadata has been successfully and accurately migrated. This confirmation may be generated internally by the system through a validation process, such as comparing metadata hashes or checking for the presence and correctness of metadata within the stored file. Alternatively, it may be triggered by an external confirmation mechanism or a metadata validation service. Once the system receives this confirmation, indicating that the metadata has been correctly embedded into the file and is now fully available at the second location, it proceeds to delete the original object-stored metadata from the first location, which is the object storage environment. This step ensures that metadata is no longer duplicated across storage systems and that the migration maintains data consistency and storage efficiency. Deletion may be carried out using a secure API call—such as delete-object-tagging or similar object metadata removal functions—ensuring that only the metadata is removed while preserving the object if needed. By coordinating confirmation and cleanup in this way, the system enforces a reliable and traceable metadata transition from object storage to file storage, while maintaining data integrity and adhering to lifecycle or compliance policies.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for data retention while migrating metadata stored in object storage of objects being migrated across container ecosystems and/or for retention of data while migrating object-stored metadata from an object storage platform to a file storage platform.
2. The method of the preceding embodiment, further comprising: receiving a first object, at a source location, for migration to a target location; determining first object-stored metadata for the first object; generating an array of the first object-stored metadata; determining a first source identifier, wherein the first source identifier corresponds to the first object at the source location; generating a first supplemental data structure comprising on the array and the first source identifier; storing the first supplemental data structure at a staging location; and executing a first function that causes the first object to be migrated from the source location to the target location and changes the first source identifier in the first supplemental data structure to a second source identifier, wherein the second source identifier corresponds to the first object at the target location.
3. The method of any one of the preceding embodiments, further comprising: generating a first hash value of the first object-stored metadata; including the first hash value in the first supplemental data structure; and validating, using the first hash value, that the first object-stored metadata has been successfully migrated to the target location.
4. The method of any one of the preceding embodiments, further comprising: receiving a data migration confirmation that the first object and the first object-stored metadata have been successfully migrated to the target location; and deleting the first supplemental data structure from the staging location.
5. The method of any one of the preceding embodiments, further comprising: in response to executing the first function, generating a second object at the target location, wherein the second object corresponds to the first object; populating second object-stored metadata for the second object based on the first object-stored metadata; validating the second object-stored metadata using a first hash value that generated based on the first object-stored metadata; and generating for display, on a user interface, a data migration confirmation based on validating the second object-stored metadata using the first hash value, wherein the data migration confirmation indicates that the first object-stored metadata was successfully migrated to the target source.
6. The method of any one of the preceding embodiments, further comprising: generating a third object-stored metadata for the first object, wherein the third object-stored metadata is not included in the first object-stored metadata; including the third object-stored metadata in the first supplemental data structure; and in response to executing the first function, generating a second object at the target location, wherein the second object corresponds to the first object, and wherein the second object comprises the third object-stored metadata.
7. The method of any one of the preceding embodiments, further comprising: comparing fourth object-stored metadata to the third object-stored metadata, wherein the fourth object-stored metadata is generated at the target location in response to migrating the first object; determining an inconsistency between the fourth object-stored metadata and the third object-stored metadata; and modifying the fourth object-stored metadata based on the inconsistency.
8. The method of any one of the preceding embodiments, further comprising: generating a first name of the first object-stored metadata; including the first name in the first supplemental data structure; in response to executing the first function, generating a second object at the target location, wherein the second object corresponds to the first object, and wherein the second object comprises a second name; determining that the first supplemental data structure corresponds to the second object based on comparing the first name to the second name; and in response to determining that the first supplemental data structure corresponds to the second object, populating second object-stored metadata for the second object based on the first supplemental data structure.
9. The method of any one of the preceding embodiments, further comprising: generating a first content type of the first object-stored metadata; including the first content type in the first supplemental data structure; in response to executing the first function, generating a second object at the target location, wherein the second object corresponds to the first object, and wherein the second object comprises a second content type; determining that the first supplemental data structure corresponds to the second object based on comparing the first content type to the second content type; and in response to determining that the first supplemental data structure corresponds to the second object, populating second object-stored metadata for the second object based on the first supplemental data structure.
10. The method of any one of the preceding embodiments, wherein generating the first supplemental data structure further comprises: determining a compatibility requirement of the target location; and formatting the first supplemental data structure based on the compatibility requirement.
11. The method of any one of the preceding embodiments, wherein generating the array of the first object-stored metadata further comprises: inputting the first object-stored metadata into an artificial intelligence model, wherein the artificial intelligence model is trained on object-stored metadata samples to generate arrays of data; and receiving an output from the artificial intelligence model, wherein the array is based on the output.

12. The method of any one of the preceding embodiments, wherein the first object-stored metadata comprises a third object that is linked to the first object.
13. The method of any one of the preceding embodiments, wherein executing the first function further comprises: determining a first application programming interface ("API") for the target location; generating a first API request, using the first API, wherein the first API request communicates the first object from the source location to the target location; and generating a second API request, using the first API, wherein the second API request communicates the first object-stored metadata from the staging location to the target location.
14. The method of any one of the preceding embodiments, further comprising: receiving a notification that the first function is executed; and in response to receiving the notification, executing a second function that causes the first object-stored metadata to be migrated from the staging location to the target location based on the second source identifier.
15. The method of any one of the preceding embodiments, further comprising: receiving, at a user interface, a first user input requesting that the first object be migrated; receiving, at the user interface, a second user input identifying the source location; and receiving, at the user interface, a third user input identifying the target location.
16. The method of any one of the preceding embodiments, further comprising: generating a first entry in a retention log of the staging location, wherein the first entry corresponds to the first object; and generating a second entry in the retention log of the staging location, wherein the second entry corresponds to the first supplemental data structure.
17. The method of any one of the preceding embodiments, further comprising: receiving a first request to migrate first object-stored metadata for a first object from a first location to a second location, wherein the first location comprises object storage, and wherein the second location comprises file storage; in response to the first request, initializing a configuration for migrating the first object-stored metadata from the first location to the second location by: determining a first object key for the first object-stored metadata at the first location; and determining a first file path to a first file at the second location; executing, based on the first object key and the first file path, a first function to migrate the first object-stored metadata from the first location to the second location; based on the first function, generating first file-stored metadata corresponding to the first object-stored metadata in the first file; and storing the first file with the first file-stored metadata at the second location.
18. The method of any one of the preceding embodiments, wherein initializing the configuration further comprises: retrieving first credentials for the first object; and providing the first credentials to the first location.
19. The method of any one of the preceding embodiments, wherein initializing the configuration further comprises: receiving a first directory for the first location; and using the first directory to determine the first object key.
20. The method of any one of the preceding embodiments, wherein initializing the configuration further comprises: determining whether a second directory exists at the second location for receiving the first object-stored metadata; and based on determining whether the second directory exists at the second location for receiving the first object-stored metadata, determining whether to create a new directory or use an existing directory.
21. The method of any one of the preceding embodiments, wherein generating the first file-stored metadata further comprises: generating a first hash value of the first object-stored metadata; including the first hash value in the first file; and validating, using the first hash value, that the first object-stored metadata has been successfully migrated to the second location.
22. The method of any one of the preceding embodiments, wherein generating the first file-stored metadata further comprises: retrieving a first boundary condition for the first file, wherein the first boundary condition indicates an internal location for injecting the first file-stored metadata into the first file; and injecting the first file-stored metadata into the first file based on the first boundary condition.
23. The method of any one of the preceding embodiments, wherein generating the first file-stored metadata further comprises: retrieving a first content condition for the first file, wherein the first content condition indicates a content constraint for injecting the first file-stored metadata into the first file; and injecting the first file-stored metadata into the first file based on a content of the first file-stored metadata corresponding to the first content condition.
24. The method of any one of the preceding embodiments, wherein generating the first file-stored metadata further comprises: retrieving a first size condition for the first file, wherein the first size condition indicates a size constraint for injecting the first file-stored metadata into the first file; and injecting the first file-stored metadata into the first file based on a size of the first file-stored metadata corresponding to the first size condition.
25. The method of any one of the preceding embodiments, wherein generating the first file-stored metadata further comprises: retrieving a first format condition for the first file, wherein the first format condition indicates a format constraint for injecting the first file-stored metadata into the first file; and injecting the first file-stored metadata into the first file based on a current format of the first file-stored metadata corresponding to the first format condition.
26. The method of any one of the preceding embodiments, wherein generating the first file-stored metadata further comprises: retrieving a first time condition for the first file, wherein the first time condition indicates a time constraint for injecting the first file-stored metadata into the first file; and injecting the first file-stored metadata into the first file based on a current time corresponding to the first time condition.
27. The method of any one of the preceding embodiments, wherein generating the first file-stored metadata further comprises: retrieving a first geographic condition for the first file, wherein the first geographic condition indicates a geographic constraint for injecting the first file-stored metadata into the first file; and injecting the first file-stored metadata into the first file based on the second location corresponding to the first geographic condition.
28. The method of any one of the preceding embodiments, wherein storing the first file with the first file-stored metadata at the second location further comprises: receiving a data migration confirmation that the first object-stored metadata have been successfully migrated to the second location; and deleting the first object-stored metadata from the first location.

29. The method of any one of the preceding embodiments, wherein executing the first function further comprises: determining a first application programming interface ("API") for the second location; generating a first API request, using the first API, wherein the first API request communicates the first request to the second location.

30. The method of any one of the preceding embodiments, wherein receiving the first request to migrate the first object-stored metadata further comprising: receiving a first data criteria for a first application; and determining that the first object corresponds to the first data criteria.

31. The method of any one of the preceding embodiments, wherein receiving the first request to migrate the first object-stored metadata further comprising: receiving a second request for training data of a first type for an artificial intelligence model, wherein the training data comprises object metadata; and in response to the second request, determining that the first object-stored metadata corresponds to the first type.

32. A tangible, non-transitory, computer-readable medium storing instructions that, when executed by a data processing apparatus, cause the data processing apparatus to perform operations comprising those of any of embodiments 1-31.

33. A system comprising one or more processors; and memory storing instructions that, when executed by the processors, cause the processors to effectuate operations comprising those of any of embodiments 1-31.

34. A system comprising means for performing any of embodiments 1-31.

What is claimed is:

1. A system for retention of data while migrating object-stored metadata from object storage platforms to file storage platforms, the system comprising:

one or more processors; and one or more non-transitory, computer-readable mediums comprising instructions that when executed by the one or more processors causes operations comprising:

receiving a first request to migrate first object-stored metadata for a first object from a first location to a second location, wherein the first location comprises an object storage platform, and wherein the second location comprises a file storage platform;

executing a first function to migrate the first object-stored metadata from the first location to the second location;

based on the first function, generating first file-stored metadata corresponding to the first object-stored metadata in a first file, wherein the first file-stored metadata comprises JavaScript Object Notation, by:

retrieving a first content condition for the first file, wherein the first content condition indicates a content constraint for injecting the first file-stored metadata into the first file; and injecting the first file-stored metadata into the first file based on the content constraint of the first file-stored metadata corresponding to the first content condition; and storing the first file with the first file-stored metadata at the second location, wherein the first file-stored metadata is stored with a structured file format of the first file.

2. A method for retention of data while migrating object-stored metadata from object storage platforms to file storage platforms, the method comprising:

receiving a first request to migrate first object-stored metadata for a first object from a first location to a second location, wherein the first location comprises an object storage platform, and wherein the second location comprises a file storage platform;

executing a first function to migrate the first object-stored metadata from the first location to the second location;

based on the first function, generating first file-stored metadata corresponding to the first object-stored metadata in a first file, wherein the first file-stored metadata comprises a structured file language, by:

retrieving a first content condition for the first file, wherein the first content condition indicates an internal location for injecting the first file-stored metadata into the first file; and injecting the first file-stored metadata into the first file based on the first content condition; and storing the first file with the first file-stored metadata at the second location, wherein the first file-stored metadata is stored with a structured file format of the first file.

3. The method of claim 2, wherein executing the first function further comprises:

retrieving first credentials for the first object; and providing the first credentials to the first location.

4. The method of claim 2, wherein executing the first function comprises:

receiving a first directory for the first location; and using the first directory to determine a first object key.

5. The method of claim 2, wherein executing the first function further comprises:

determining whether a second directory exists at the second location for receiving the first object-stored metadata; and based on determining whether the second directory exists at the second location for receiving the first object-stored metadata, determining whether to create a new directory or use an existing directory.

6. The method of claim 2, wherein executing the first function further comprises:

generating a first hash value of the first object-stored metadata;

including the first hash value in the first file; and validating, using the first hash value, that the first object-stored metadata has been successfully migrated to the second location.

7. The method of claim 2, further comprising:

in response to the first request, initializing a configuration for migrating the first object-stored metadata from the first location to the second location by:

determining a first object key for the first object-stored metadata at the first location, wherein a relationship between the first object and the first object-stored metadata is defined by a key-value pair; and determining a first file path to the first file at the second location.

8. The method of claim 2, wherein executing the first function further comprises:

retrieving a first boundary condition for the first file, wherein the first boundary condition indicates a boundary constraint for injecting the first file-stored metadata into the first file; and injecting the first file-stored metadata into the first file based on the boundary constraint of the first file-stored metadata corresponding to the first boundary condition.

9. The method of claim 2, wherein executing the first function further comprises:

retrieving a first size condition for the first file, wherein the first size condition indicates a size constraint for injecting the first file-stored metadata into the first file; and injecting the first file-stored metadata into the first file based on a size of the first file-stored metadata corresponding to the first size condition.

10. The method of claim 2, wherein executing the first function further comprises:

retrieving a first format condition for the first file, wherein the first format condition indicates a format constraint for injecting the first file-stored metadata into the first file; and injecting the first file-stored metadata into the first file based on a current format of the first file-stored metadata corresponding to the first format condition.

11. The method of claim 2, wherein executing the first function further comprises:

retrieving a first time condition for the first file, wherein the first time condition indicates a time constraint for injecting the first file-stored metadata into the first file; and injecting the first file-stored metadata into the first file based on a current time corresponding to the first time condition.

12. The method of claim 2, wherein executing the first function further comprises:

retrieving a first geographic condition for the first file, wherein the first geographic condition indicates a geographic constraint for injecting the first file-stored metadata into the first file; and injecting the first file-stored metadata into the first file based on the second location corresponding to the first geographic condition.

13. The method of claim 2, wherein storing the first file with the first file-stored metadata at the second location further comprises:

receiving a data migration confirmation that the first object-stored metadata have been successfully migrated to the second location; and deleting the first object-stored metadata from the first location.

14. The method of claim 2, wherein executing the first function further comprises:

determining a first application programming interface ("API") for the second location;

generating a first API request, using the first API, wherein the first API request communicates the first request to the second location.

15. The method of claim 2, wherein receiving the first request to migrate the first object-stored metadata further comprising:

receiving a first data criteria for a first application; and determining that the first object corresponds to the first data criteria.

16. The method of claim 2, wherein receiving the first request to migrate the first object-stored metadata further comprising:

receiving a second request for training data of a first type for an artificial intelligence model, wherein the training data comprises object metadata; and in response to the second request, determining that the first object-stored metadata corresponds to the first type.

17. One or more non-transitory, computer-readable mediums, comprising instructions that, when executed by one or more processors, cause operations comprising:

receiving a data request for data of a first type for a first application;

in response to determining that first object-stored metadata corresponds to the first type, determining to migrate the first object-stored metadata from a first location to a second location, wherein the first location comprises an object storage platform, and wherein the second location comprises a file storage platform;

executing a first function to migrate the first object-stored metadata from the first location to the second location;

based on the first function, generating first file-stored metadata corresponding to the first object-stored metadata in a first file, wherein the first file-stored metadata comprises a structured file language, by:

retrieving a first content condition for the first file, wherein the first content condition indicates a content constraint for injecting the first file-stored metadata into the first file; and injecting the first file-stored metadata into the first file based on current content of the first file-stored metadata corresponding to the first content condition; and storing the first file with the first file-stored metadata at the second location, wherein the first file-stored metadata is stored with a structured file format of the first file.

18. The one or more non-transitory, computer-readable mediums of claim 17, wherein executing the first function further comprises:

retrieving first credentials for a first object; and providing the first credentials to the first location.

19. The one or more non-transitory, computer-readable mediums of claim 17, wherein executing the first function further comprises:

determining whether a second directory exists at the second location for receiving the first object-stored metadata; and based on determining whether the second directory exists at the second location for receiving the first object-stored metadata, determining whether to create a new directory or use an existing directory.

20. The one or more non-transitory, computer-readable mediums of claim 17, wherein executing the first function further comprises:

retrieving a first boundary condition for the first file, wherein the first boundary condition indicates an internal location for injecting the first file-stored metadata into the first file; and injecting the first file-stored metadata into the first file based on the first boundary condition.

* * * * *